(12) United States Patent
Arai et al.

(10) Patent No.: US 7,499,638 B2
(45) Date of Patent: Mar. 3, 2009

(54) OBJECT RECOGNITION APPARATUS

(75) Inventors: Kazuhiko Arai, Hachioji (JP);
Hidekazu Iwaki, Hachioji (JP); Takashi Miyoshi, Atsugi (JP)

(73) Assignee: Olympus Corporation, Tokyo (JP)

( * ) Notice: Subject to any disclaimer, the term of this patent is extended or adjusted under 35 U.S.C. 154(b) by 298 days.

(21) Appl. No.: 11/286,278

(22) Filed: Nov. 23, 2005

(65) Prior Publication Data
US 2006/0072914 A1    Apr. 6, 2006

Related U.S. Application Data

(63) Continuation of application No. PCT/JP2004/011927, filed on Aug. 19, 2004.

(30) Foreign Application Priority Data
Aug. 28, 2003   (JP)   ............... 2003-304710

(51) Int. Cl.
*G03B 13/00* (2006.01)
*G01C 23/00* (2006.01)
*G08G 1/01* (2006.01)

(52) U.S. Cl. .............. 396/108; 396/106; 396/157; 701/301; 348/370

(58) Field of Classification Search ........... 396/106, 396/108, 157; 348/49, 370, 371; 701/301; 340/435–436
See application file for complete search history.

(56) References Cited

U.S. PATENT DOCUMENTS 6,330,055 B1   12/2001   Higashino 6,580,385 B1   6/2003   Winner et al.
7,263,209 B2 *  8/2007   Camus et al. ............ 382/104
2002/0005778 A1   1/2002   Breed et al.
2003/0063006 A1 *  4/2003   Gutta et al. ............... 340/603

FOREIGN PATENT DOCUMENTS

| GB | 2 343 804 | 5/2000 |
| GB | 2 373 117 | 9/2002 |
| JP | 05-114099 | 5/1993 |

(Continued)

OTHER PUBLICATIONS

PCT Form PCT/IB/338 for International Application Serial No. PCT/JP2004/011927 Issued May 8, 2006.
PCT International Preliminary Report on Patentability, Form PCT/IB/373, for International Application Serial No. PCT/JP2004/011927 Issued May 8, 2006.

(Continued)

*Primary Examiner*—Bot LeDynh
(74) *Attorney, Agent, or Firm*—Straub & Pokotylo; John C. Pokotylo

(57) ABSTRACT

The object recognition apparatus has an active range finder having a floodlight unit which floodlights a light onto a target object, and determines a distance up to a target object on the basis of a reflected light therefrom, a stereo camera to determine a distance up to the target object on the basis of image information from the target object, an object recognition unit which recognizes the target object on the basis of an output signal from the active range finder and an output signal from the stereo camera, and a fill light control unit which controls the floodlight unit to operate so as to irradiate a light floodlit by the floodlight unit as a fill light of the stereo camera.

32 Claims, 21 Drawing Sheets

FOREIGN PATENT DOCUMENTS

| | | |
|---|---|---|
| JP | 05-189694 | 7/1993 |
| JP | 05-338487 | 12/1993 |
| JP | 2000-171687 | 6/2000 |
| JP | 2000-329852 | 11/2000 |
| JP | 2002-240629 | 8/2002 |
| JP | 2003-121547 | 4/2003 |
| JP | 2003-134509 | 5/2003 |

OTHER PUBLICATIONS

PCT Written Opinion of the International Searching Authority (Translation), form PCT/ISA/237, (3 pages) for International Application Serial No. PCT/JP2004/011927 Issued May 8, 2006.

Supplementary European Search Report for European Patent Application No. 04771888.7, dated Dec. 20, 2007 (3 pgs.).

* cited by examiner

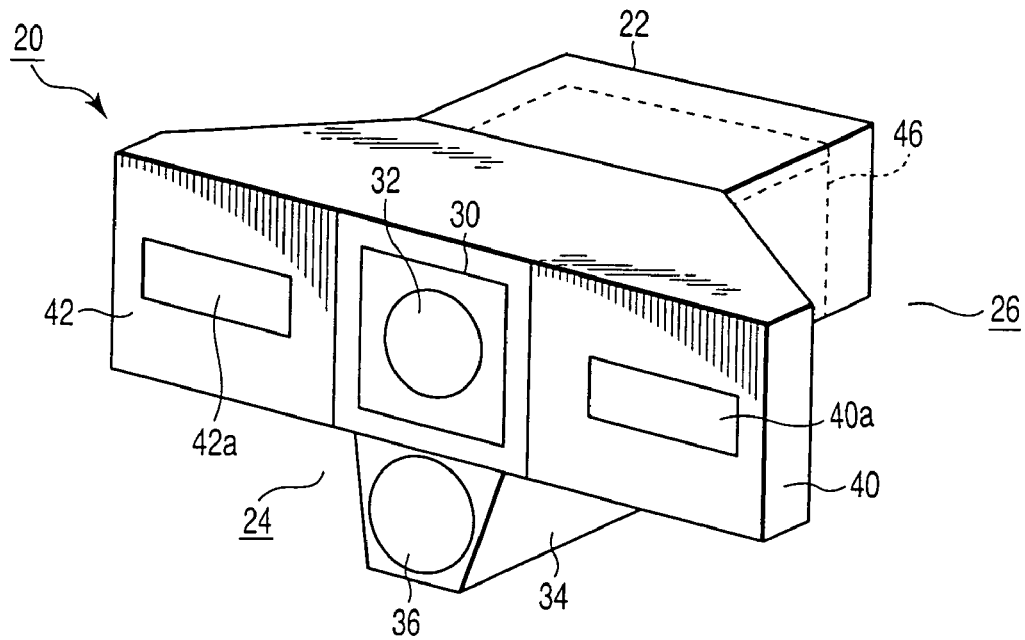
F I G. 2
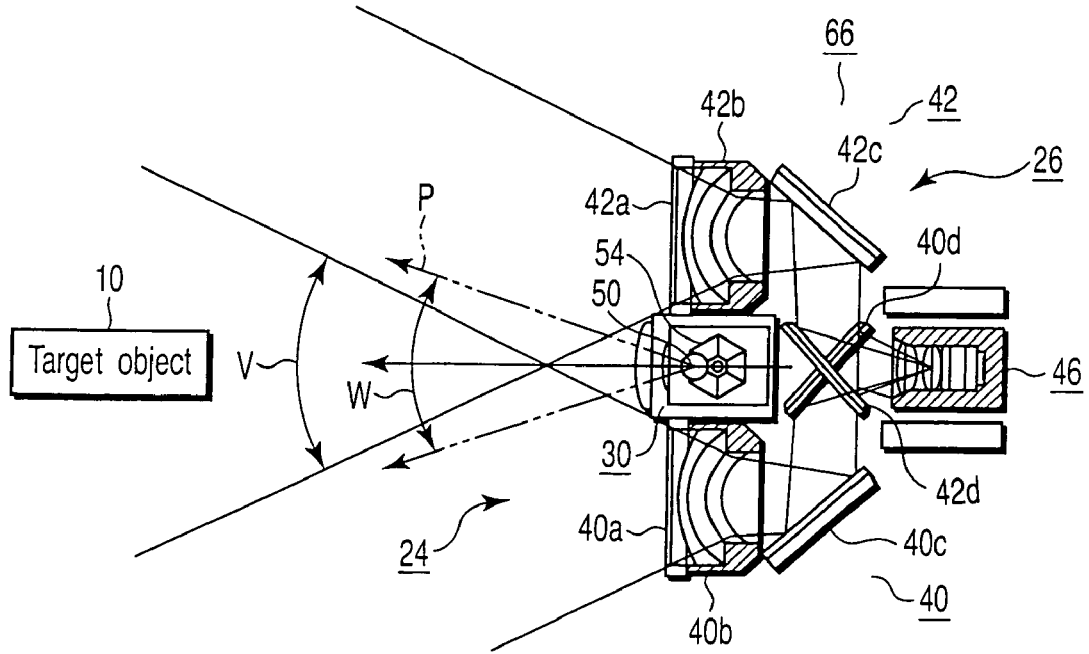
F I G. 3A

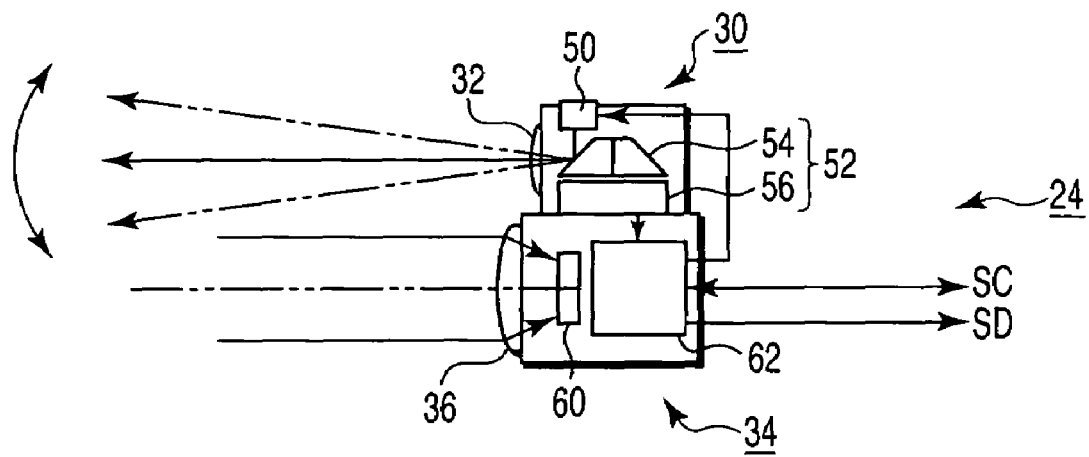
F I G. 3B
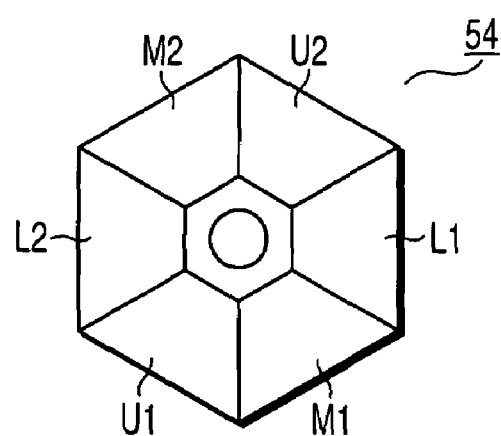
F I G. 3C

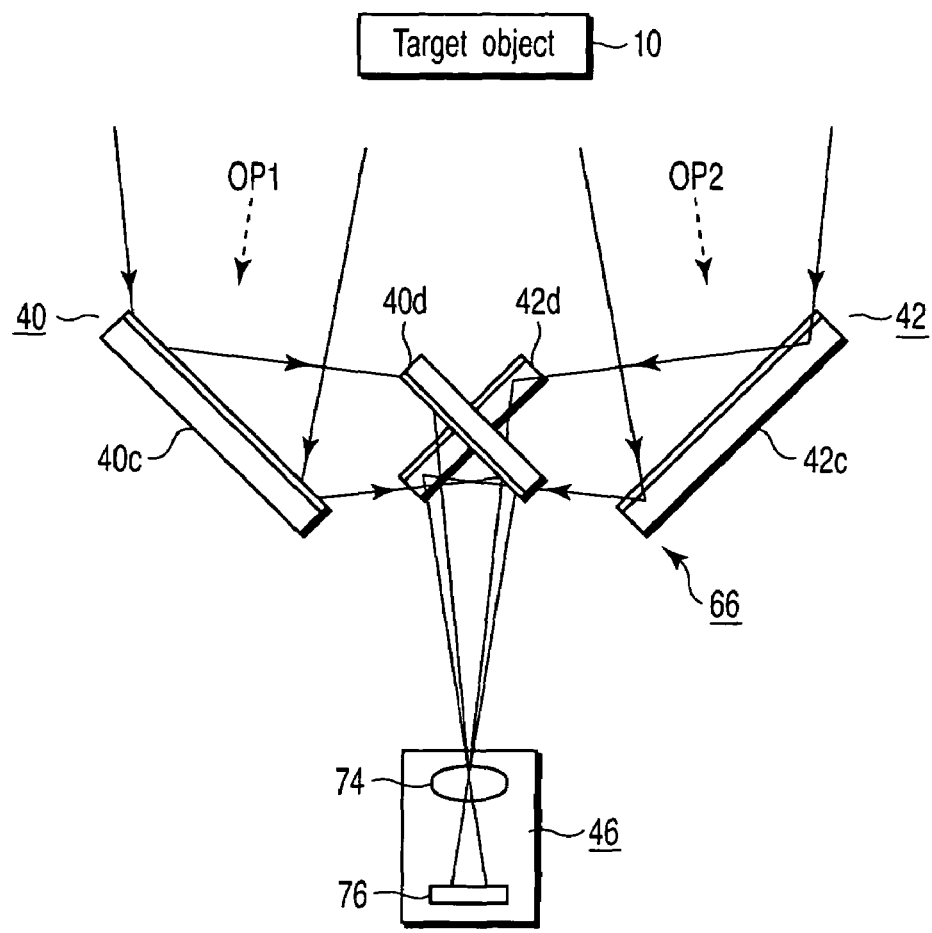
F I G. 4A
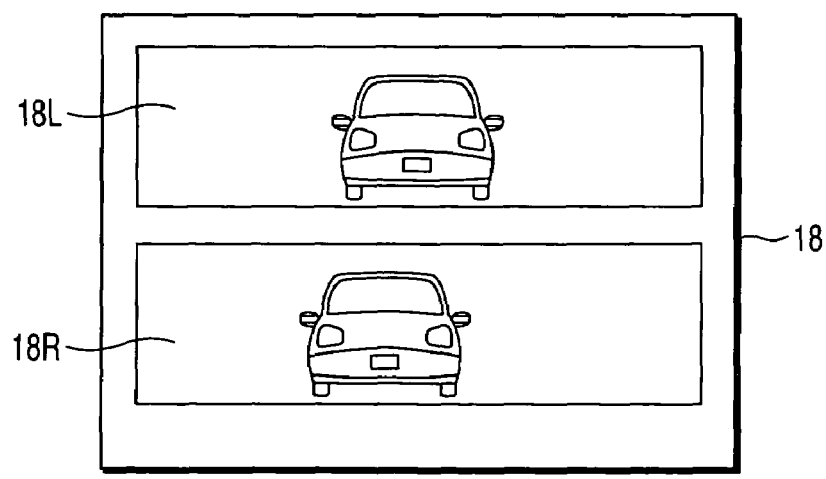
F I G. 4B

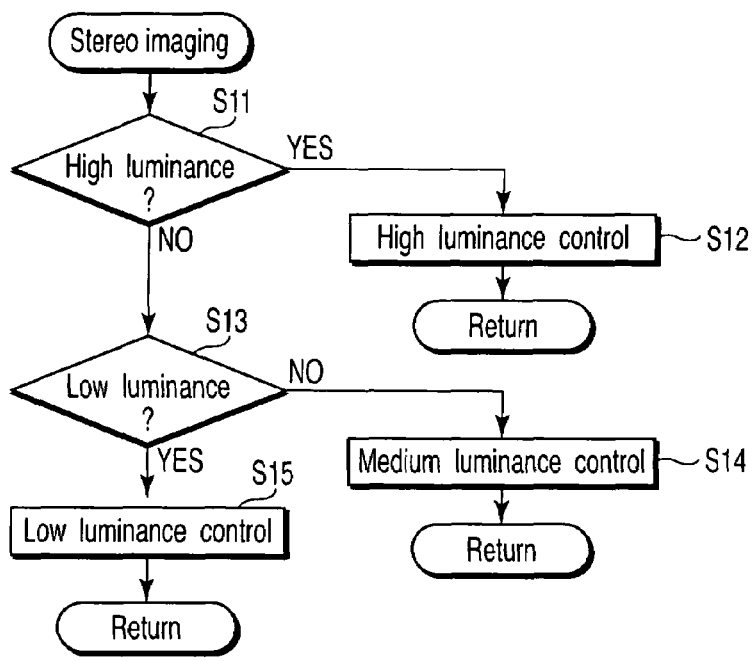

FIG. 12

| | Luminance | Shutter opening period (charge storage period) | Aperture | Image pickup device sensitivity setting | Fill light by laser light source |
|---|---|---|---|---|---|
| X | High luminance | 1 μsec~ 15msec | Fix to minimum aperture | Fix to minimum sensitivity | No |
| Y | Medium luminance | Fix to 15msec | Variable from minimum aperture to maximum aperture (Variable in accordance with luminance) | Fix to minimum sensitivity | Yes (Variable in accordance with distance and aperture) |
| Z | Low luminance | Fix to 15msec | Fix to maximum aperture | Variable from minimum sensitivity to maximum sensitivity (Variable in accordance with luminance) | Yes (Variable in accordance with distance and sensitivity) |

FIG. 13

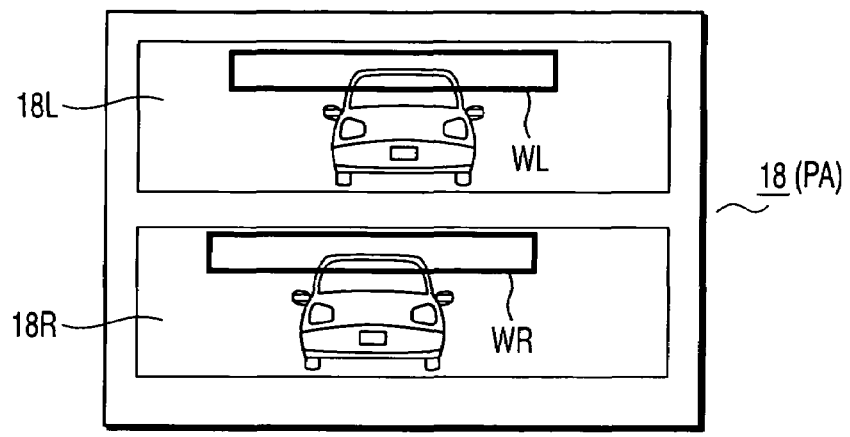
F I G. 17A
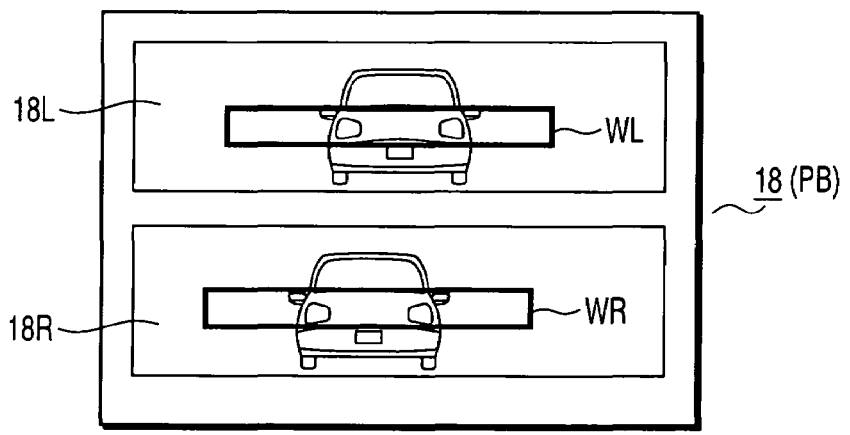
F I G. 17B
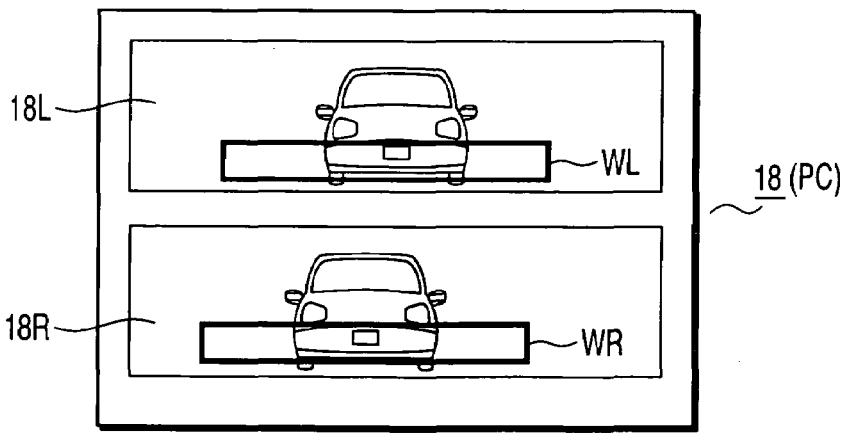
F I G. 17C

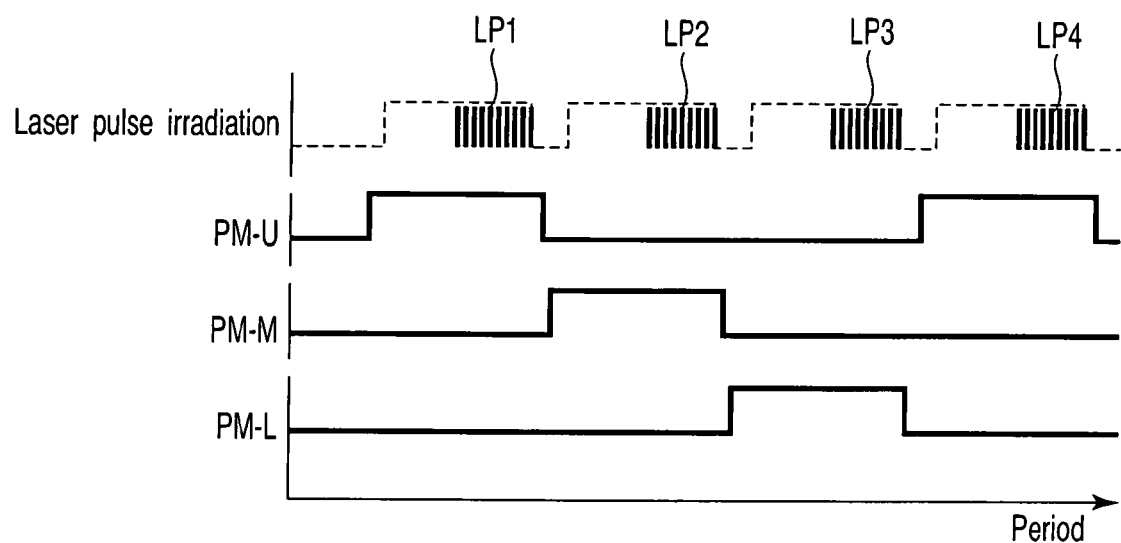
F I G. 21

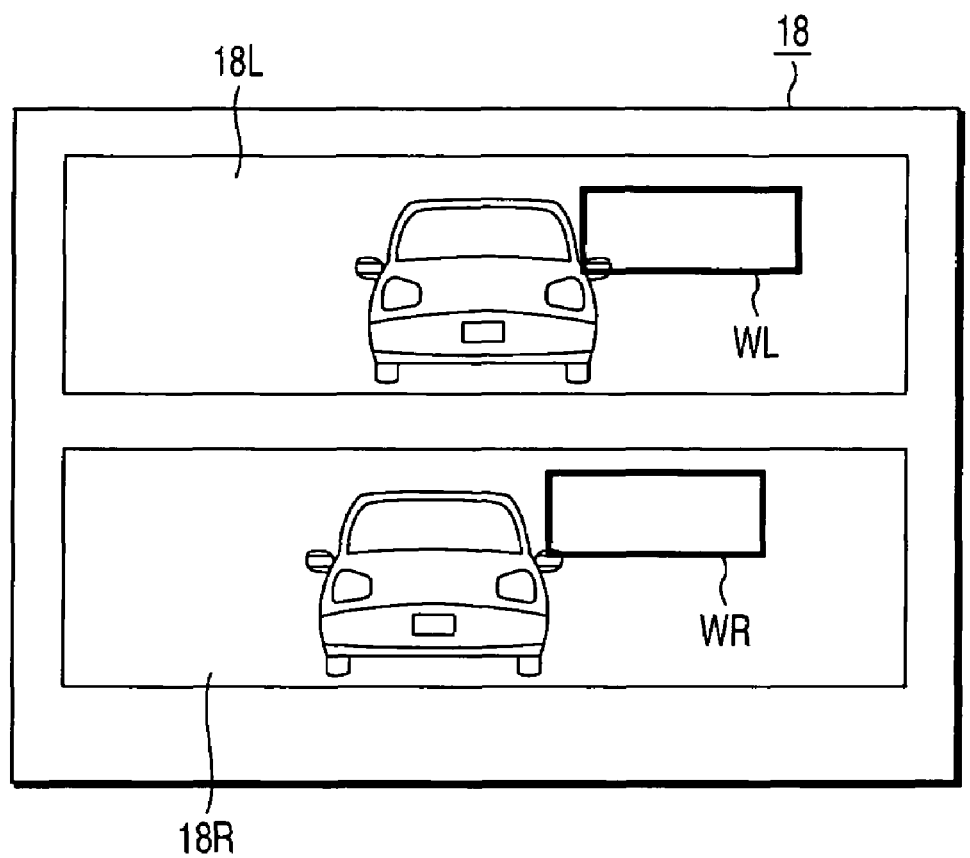
F I G. 22A
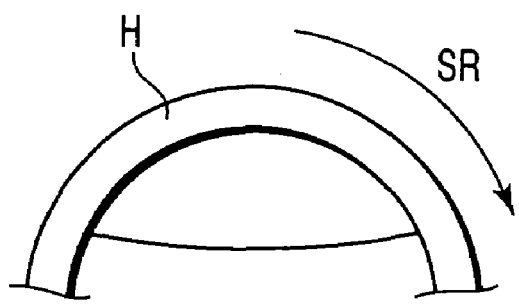
F I G. 22B

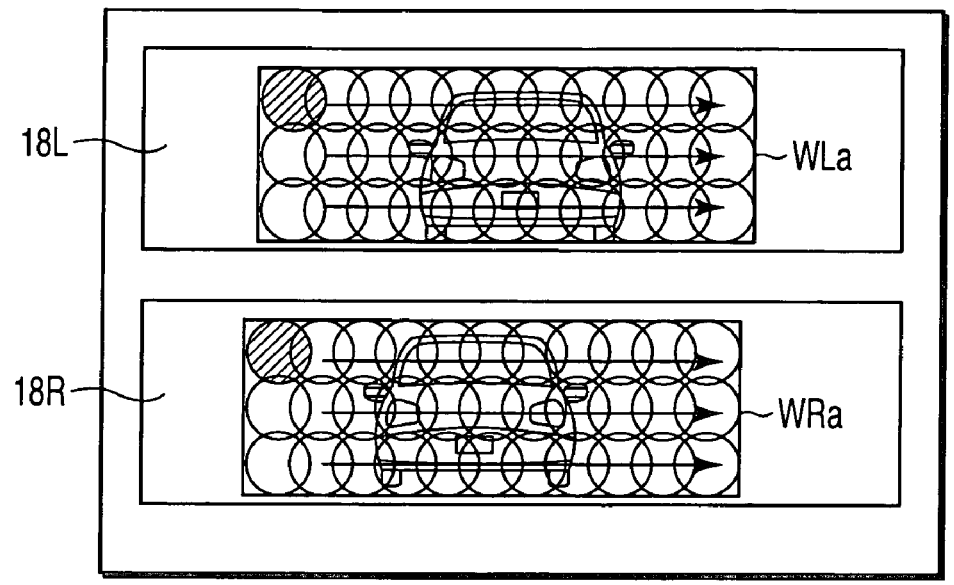
F I G. 23A
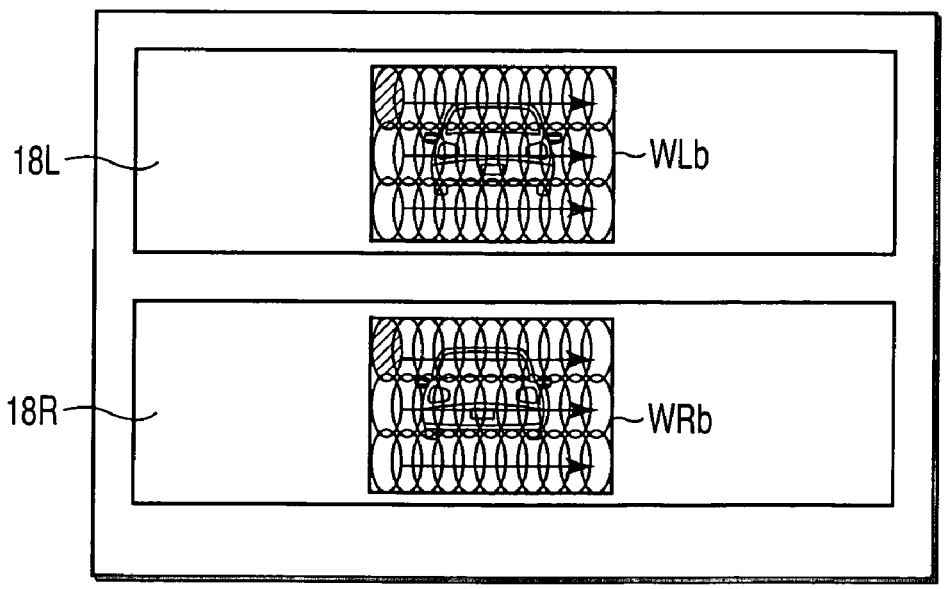
F I G. 23B

OBJECT RECOGNITION APPARATUS

CROSS REFERENCE TO RELATED APPLICATIONS

This is a Continuation application of PCT Application No. PCT/JP2004/011927, filed Aug. 19, 2004, which was published under PCT Article 21(2) in Japanese.

This application is based upon and claims the benefit of priority from prior Japanese Patent Application No. 2003-304710, filed Aug. 28, 2003, the entire contents of which are incorporated herein by reference.

BACKGROUND OF THE INVENTION

1. Field of the Invention

The present invention relates to an object recognition apparatus which is used to be mounted on a movable body such as an automobile, an airplane, a ship and a robot, or a non-movable body such as an outdoor monitoring system.

2. Description of the Related Art

As an apparatus mounted on an automobile or the like, for recognizing an object in front thereof, a stereo camera has been known. This stereo camera has a function of observing a target object from different visual directions, and of measuring a distance up to the target object. The technology of the stereo camera is already broadly known in accordance with, for example, Jpn. Pat. Appln. KOKAI Publication No. 5-114099, and the like.

It is difficult in general for the stereo camera to detect an object and detect a distance appropriately in a dark place. Further, when a target object is in a low contrast even in a bright place, it is difficult to accurately find a distance up to the target object.

On the other hand, as an on-board video camera, a video camera using headlights as fill lights is known in accordance with Jpn. Pat. Appln. KOKAI Publication Nos. 5-189694 and 5-338487, and the like.

Further, a technology as well in which an emission device for emitting infrared radiation as a fill light is added to an on-board video camera, and illumination is carried out while synchronizing an image pickup timing of the video camera and a light emission timing of an infrared fill light from the emission device is well known in accordance with Jpn. Pat. Appln. KOKAI Publication No. 2002-240629 and the like.

Moreover, in Jpn. Pat. Appln. KOKAI Publication No. 2003-134509, a video camera using a laser beam as a fill light is disclosed as an on-board video camera.

In a video camera using infrared radiation or a laser beam as a fill light, it is necessary to add a light source for emitting a fill light, which results in an increase in cost for the apparatus.

Recently, a technology in which two types of range devices such as a stereo camera and a laser radar are provided together, and object recognition carried out in accordance with a predetermined algorithm on the basis of ranged results from both range devices is known in accordance with Jpn. Pat. Appln. KOKAI Publication Nos. 2000-329852 and 2003-121547, and the like.

In the complex type object recognition apparatus in which two types of range devices are provided together, highly reliable ranging performance and object recognition according to a situation are possible by utilizing the advantages possessed by the stereo camera and the laser radar, respectively. Namely, according to the stereo camera, it is impossible to accurately detect a distance up to a target object which is a long way off. However, it is possible to recognize a shape of a target object which is at a comparatively short distance in detail, and it is also possible to sense a road surface and a white line on a road. In contrast thereto, in the laser radar, a shape of a target object cannot be detected in detail, but it is possible to accurately detect a distance up to a target object which is a long way off (for example, a distance greater than or equal to 100 mm).

In above-described Jpn. Pat. Appln. KOKAI Publication Nos. 2000-329852 and 2003-121547, there is disclosed a technology relating to means for optimally integrating both range devices in order to utilize the advantages of the two.

BRIEF SUMMARY OF THE INVENTION

Accordingly, an object of the present invention is to provide an object recognition apparatus which can recognize an object with extremely high reliability by both a stereo camera and an active range finder, and which can reduce an installation space, and can be manufactured at a low cost.

Note that the aforementioned active range finder means a measuring device, for example, a laser radar, which irradiates an electromagnetic wave such as a laser beam onto a target object, and receives a reflected wave therefrom, and which carries out ranging on the basis of information included in the reflected wave.

A feature of the present invention is an object recognition apparatus comprising:

an active range finder having a floodlight unit which floodlights a light onto a target object, and determines a distance up to a target object on the basis of a reflected light therefrom;

a stereo camera to determine a distance up to the target object on the basis of image information from the target object;

an object recognition unit which recognizes the target object on the basis of an output signal from the active range finder and an output signal from the stereo camera; and a fill light control unit which controls the floodlight unit to operate so as to irradiate a light floodlit by the floodlight unit of the active range finder as a fill light of the stereo camera.

Another feature of the present invention is an object recognition apparatus comprising:

an active range finder having a floodlight unit which floodlights a light onto a target object, and determines a distance up to a target object on the basis of a reflected light therefrom;

a stereo camera to determine a distance up to the target object on the basis of image information from the target object;

an object recognition unit which recognizes the target object on the basis of an output signal from the active range finder and an output signal from the stereo camera;

a fill light control unit which controls the floodlight unit to operate so as to irradiate a light floodlit by the floodlight unit of the active range finder as a fill light of the stereo camera; and a cover glass disposed in front of the stereo camera, wherein, with respect to the cover glass, a predetermined region including a region into which a light that is floodlit from the floodlight unit of the active range finder, and is reflected from the target object, is incident serves as an infrared radiation permeable region, and a region other than the predetermined region serves as an infrared radiation permeability-limited region.

Still another feature of the present invention is an object recognition apparatus comprising:

an active range finder having a floodlight unit which floodlights a light onto a target object, and determines a distance up to a target object on the basis of a reflected light therefrom;

a stereo camera to determine a distance up to the target object on the basis of image information from the target object;

a fill light control unit which irradiates a light floodlit by the floodlight unit of the active range finder as a fill light of the stereo camera onto an irradiating range in a predetermined relationship with a visual field range of the stereo camera; and an object recognition unit which recognizes the target object on the basis of an output signal from the active range finder and an output signal from the stereo camera.

Further another feature of the present invention is an object recognition apparatus comprising:

an active range finder having a floodlight unit which floodlights a light onto a target object, and determines a distance up to a target object on the basis of a reflected light therefrom;

a stereo camera to determine a distance up to the target object on the basis of image information from the target object;

an object recognition unit which recognizes the target object on the basis of an output signal from the active range finder and an output signal from the stereo camera; and a fill light control unit which controls the floodlight unit to operate so as to irradiate a light floodlit by the floodlight unit of the active range finder as a fill light of the stereo camera, wherein the fill light control unit carries out control of the floodlight unit as a fill light irradiation unit on the basis of image information obtained from the stereo camera.

Still further another feature of the present invention is an object recognition apparatus comprising:

an active range finder having a floodlight unit which floodlights a light onto a target object, and determines a distance up to a target object on the basis of a reflected light therefrom;

a stereo camera to determine a distance up to the target object on the basis of image information from the target object;

an object recognition unit which recognizes the target object on the basis of an output signal from the active range finder and an output signal from the stereo camera;

a fill light control unit which controls the floodlight unit to operate so as to irradiate a light floodlit by the floodlight unit of the active range finder as a fill light of the stereo camera; and a reliability determining unit to determine reliability in object recognition performance on the basis of an output signal from the active range finder and an output signal from the stereo camera.

BRIEF DESCRIPTION OF THE SEVERAL VIEWS OF THE DRAWING

FIG. 2 is a perspective view showing an exterior appearance of the object recognition apparatus according to the first embodiment of the invention.

FIG. 3A is a cross-sectional view showing an internal configuration of the object recognition apparatus according to the first embodiment of the invention.

FIG. 3B shows the internal configuration of the object recognition apparatus according to the first embodiment of the invention, and is a longitudinal sectional view taken along a portion of an active range finder.

FIG. 3C shows the internal configuration of the object recognition apparatus according to the first embodiment of the invention, and is a top view of a polygon mirror.

FIG. 4A shows a configuration of a stereo camera of the object recognition apparatus according to the first embodiment of the invention, and is a schematic view showing a stereo optical system and an image pickup unit.

FIG. 4B shows a configuration of the stereo camera of the object recognition apparatus according to the first embodiment of the invention, and is a view showing an example of an obtained stereo image.

FIG. 12 is a subroutine of a stereo imaging sequence in step S1 in the flowchart of FIG. 10.

FIG. 13 is an explanatory chart in which commentaries on the flows of the stereo imaging sequence shown in the flowchart of FIG. 10 are collected up in a tabular form.

FIG. 17A is a view showing a relationship among stereo images obtained by photographing three times and the active projection irradiating ranges WL and WR, and showing a relationship among stereo images obtained by a first photographing and the active projection irradiating ranges WL and WR in the object recognition apparatus according to the third embodiment of the invention.

FIG. 17B is a view showing a relationship among stereo images obtained by photographing three times and the active projection irradiating ranges WL and WR, and showing a relationship among stereo images obtained by a second photographing and the active projection irradiating ranges WL and WR in the object recognition apparatus according to the third embodiment of the invention.

FIG. 17C is a view showing a relationship among stereo images obtained by photographing three times and the active projection irradiating ranges WL and WR, and showing a relationship among stereo images obtained by a third photographing and the active projection irradiating ranges WL and WR in the object recognition apparatus according to the third embodiment of the invention.

FIG. 21 shows an operation of an object recognition apparatus according to a sixth embodiment of the present invention, and is a timing chart showing a correspondence among irradiation timings of laser pulses and rotation cycles of respective inclined reflection surfaces of a polygon mirror.

FIG. 22A is a view showing a relationship among stereo images obtained in the object recognition apparatus according to the sixth embodiment of the invention and the active projection irradiating ranges WL and WR.

FIG. 22B is a schematic view showing an operating direction of a steering angle of a steering wheel corresponding to FIG. 22A.

FIG. 23A is a view showing a relationship among stereo images obtained in an object recognition apparatus according to a seventh embodiment of the present invention and the active projection irradiating ranges WL and WR, the view showing a case of normal time.

FIG. 23B is a view showing a relationship among stereo images obtained in the object recognition apparatus according to the seventh embodiment of the invention and the active projection irradiating ranges WL and WR, the view showing a case of emitting so as to insert a cylindrical lens, and to make light emission pulse cycles short.

DETAILED DESCRIPTION OF THE INVENTION

Hereinafter, embodiments of the present invention will be described with reference to the drawings.

First Embodiment

Figure 1A:
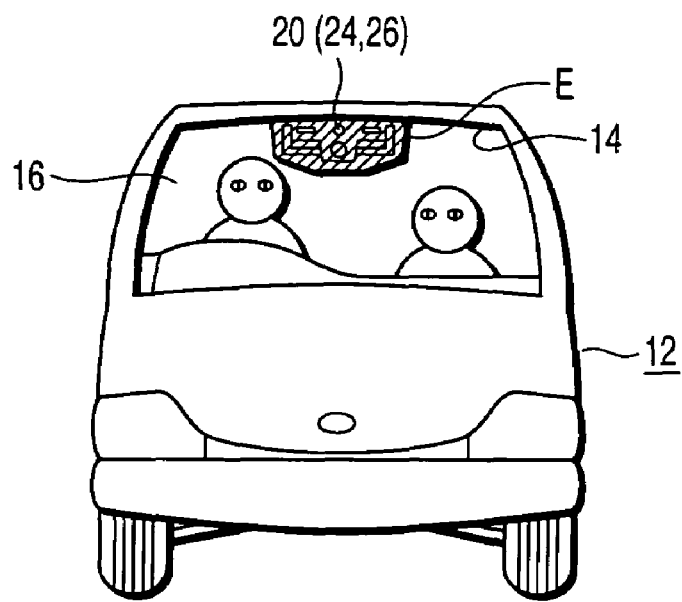
FIG. 1A shows one example in which an object recognition apparatus according to a first embodiment of the present invention is applied to a vehicle (a passenger car), and is an exterior appearance front elevation viewed from the front of the vehicle.
Figure 1B:
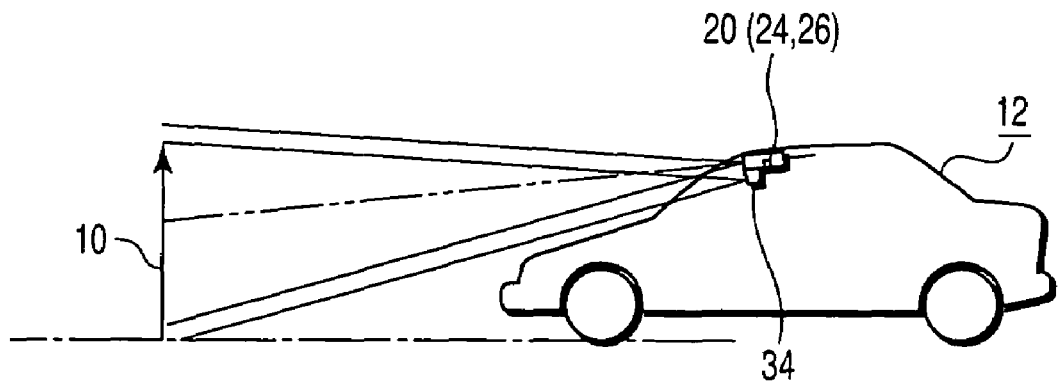
FIG. 1B shows one example in which the object recognition apparatus according to the first embodiment of the invention is applied to the vehicle (the passenger car), and is a schematic illustration viewed from a side of the vehicle.

FIGS. 1A and 1B are views showing one example in which an object recognition apparatus according to a first embodiment of the present invention is applied to a vehicle (passenger car), where FIG. 1A is an exterior appearance front elevation viewed from the front of the vehicle, and FIG. 1B is a schematic explanatory diagram viewed from a side of the vehicle. FIG. 2 is a perspective view showing an exterior appearance of the object recognition apparatus according to the first embodiment of the invention.

As shown in FIGS. 1A, 1B and 2, an object recognition apparatus 20 is attached inside a vehicle interior 14 of a vehicle 12. The object recognition apparatus 20 is configured such that an active range finder 24 composed of, for example, a laser radar, and a stereo camera 26 are integrally housed in a case 22 serving as a housing, which makes the both be a single unit.

A floodlight window 32 in a flood light unit 30 of the active range finder 24 is disposed at an upper portion at the center of the front face of the case 22. Further, a sensor window 36 in a light receiving unit 34 of the active range finder 24 is disposed at a lower portion at the center of the front face of the case 22. Moreover, a left visual field opening 40a at a left optical input unit 40 of the stereo camera 26 is disposed at the left side portion at the front face of the case 22. In the same way, a right visual field opening 42a at a right optical input unit 42 of the stereo camera 26 is disposed at the right side portion at the front face of the case 22. An image pickup unit 46 of the stereo camera 26 is housed in a rear case of the case 22.

As shown in FIGS. 1A and 1B, the active range finder 24 and the stereo camera 26 are made to be a single unit, and installed at an upper region of a windshield of the vehicle 12. Therefore, efficient fill light irradiation is possible as compared with a case where the active range finder 24 and the stereo camera 26 are installed so as to have a space at separate places at the front part of the vehicle 12 (for example, the stereo camera 26 is at the upper region of the windshield, and the active range finder 24 is in the vicinity of the front bumper).

Namely, if those are disposed as in FIGS. 1A and 1B, the coincidence between a light emitting point of a fill light and a visual point of the stereo camera can be improved when the floodlight unit 30 of the active range finder 24 is used as fill light irradiating means of the stereo camera 26. Accordingly, at the time of imaging by the stereo camera 26, efficient fill light irradiation is possible.

In contrast thereto, when the active range finder 24 and the stereo camera 26 are attached so as to have a space at separate places, the coincidence between a light emitting point of a fill light and a visual point of the stereo camera 26 is low. Therefore, when a target object 10 is a three-dimensional object, portions on which a fill light misses are generated, and a shadow is brought about on an image of the stereo camera 26. In other words, it is impossible to carry out efficient fill light irradiation.

Further, when object recognition is carried out in accordance with predetermined algorithm on the basis of a ranged result of the stereo camera 26 and a ranged result of the active range finder 24, a parallax between the detection systems of the both is preferably little. In the dispositions of FIGS. 1A and 1B, a parallax between the both detection systems is extremely little. However, when the both are attached so as to have a space at separate places, it is inevitable that a certain level of parallax is brought about.

By the way, a windshield 16 of the vehicle 12 to which the object recognition apparatus 20 is attached constitutes a cover glass according to the invention. The cover glass 16 is disposed at the front face of the active range finder 24 and the stereo camera 26. Then, the cover glass 16 has a predetermined region E serving as an infrared radiation permeable region, the predetermined region E including a region into which a light floodlit from the floodlight unit 30 of the active range finder 24 and reflected from the target object 10 is incident.

The other region than the predetermined region E is an infrared radiation permeability-limited region. The predetermined region E is a permeable region on a part or all of a frequency domain of an infrared radiation floodlit from the floodlight unit 30.

Next, the detailed configurations of the active range finder 24 and the stereo camera 26 will be described with reference to FIGS. 3A to 3C, 4A and 4B.

FIGS. 3A to 3C are diagrams showing an internal configuration of the object recognition apparatus 20, where FIG. 3A is a cross-sectional view, FIG. 3B is a longitudinal sectional view taken along the part of the active range finder 24, and FIG. 3C is a top view of a polygon mirror 54.

As shown in FIGS. 3A to 3C, the active range finder 24 has the floodlight unit 30 serving as floodlighting means for floodlighting a light (an infrared radiation) onto the target object 10, and the light receiving unit 34 which receives the reflected light and determines a distance up to the target object 10.

The floodlight unit 30 is mounted on a position which is at the substantially center of the two optical input units 40 and 42 of the stereo camera 26. The floodlight unit 30 has a laser light source 50 and a scanning unit 52 which mechanically scans a light flux from the light source 50. The scanning unit 52 has the polygon mirror 54 in which a plurality of mirrors are arranged in a multi-angular pyramid shape, and a scanning motor 56 which carries out the scanning of a light flux by driving the polygon mirror 54 to rotate.

The polygon mirror 54 has six surfaces of U1, M1, L1, U2, M2, and L2 serving as surfaces which reflect a light from the laser light source 50 as shown in FIG. 3C. The U1 and U2 are inclined reflection surfaces having the same angle at a predetermined level against the horizontal surface, and scan the upper portion of an irradiating range W in the horizontal direction by utilizing the inclined reflection surfaces. The M1 and M2 as well are inclined reflection surfaces having the same angle at a predetermined level, which is different from that of the U1 and U2, against the horizontal surface, and scan the central portion of an irradiating range W in the horizontal direction by utilizing the inclined reflection surfaces. The L1 and L2 as well are inclined reflection surfaces having the same angle at a predetermined level, which is different from those of the U1 and U2 and M1 and M2, against the horizontal surface, and scan the lower portion of an irradiating range W in the horizontal direction by utilizing the inclined reflection surfaces. In this way, the upper portion, the central portion, and the lower portion of the irradiating range W can be scanned respectively twice while the polygon mirror 54 is being rotated one cycle.

The floodlight unit 30 has means for adjusting the irradiating range W, on which the light flux is irradiated as a fill light of the stereo camera 26, to the right and left by adjusting a relationship between a light emission timing of the laser light source 50 and an operation timing of the scanning unit 52. This point will be described in detail later.

Further, the floodlight unit 30 has an adjustment mechanism (not shown) for adjusting an irradiation angle of a light flux to be floodlit up and down by adjustably setting a supporting angle of the floodlight unit 30 upward and downward.

On the other hand, the light receiving unit 34 has a light receiving element 60 and a measuring circuit unit 62. SC denotes a control signal to be inputted to the light receiving unit 34, and SD denotes a distance output signal to be outputted from the light receiving unit 34.

The active range finder 24 receives at the light receiving unit 34 a light reflected from the target object 10, for example, of an infrared radiation emitted from the floodlight unit 30, and determines a distance up to the target object 10 on the basis of a time difference (which may be information such as a phase difference or others) from the light emission to the light reception.

The stereo camera 26 is configured to determine a distance up to the target object 10 on the basis of image information from the target object 10. The stereo camera 26 has a stereo optical system 66 and an image pickup unit 46. The stereo optical system 66 has the two optical input units 40 and 42 for acquiring image information from the target object 10 from different visual directions. The two optical input units 40 and 42 have a pair of front curvature units 40b and 42b, a pair of primary deflecting mirrors 40c and 42c, and a pair of secondary deflecting mirrors 40d and 42d.

The pair of front curvature units 40b and 42b are disposed so as to receive a light from the same target object 10 at left and right positions with a space at a predetermined interval. The pair of secondary deflecting mirrors 40d and 42d are to further reflect respective lights reflected on the primary deflecting mirrors 40c and 42c so as to be introduced into the image pickup unit 46.

FIG. 4A shows a schematic configuration of the stereo optical system 66 and the image pickup unit 46 of the stereo camera 26. FIG. 4B shows a stereo image 18 obtained by the stereo optical system 66.

Light fluxes OP1 and OP2 from the target object 10 which have been incident via the front curvature units 40b and 42b are reflected on the primary deflecting mirrors 40c and 42c. These primary deflecting mirrors 40c and 42c have sizes to such an extent that it is possible to reflect light fluxes permeated through the front curvature units 40b and 42b. Namely, the primary deflecting mirrors 40c and 42c have sizes to an extent which is substantially the same as or slightly greater than unscreened regions of the front curvature units 40b and 42b.

Further, the primary deflecting mirrors 40c and 42c are disposed so as to be inclined at about 45 degrees in the horizontal direction. Then, the primary deflecting mirror 40c is disposed in a state of being inclined downward by several degrees to the secondary deflecting mirror 40d side in the vertical direction. On the other hand, the primary deflecting mirror 42c is disposed in a state of being inclined upward by several degrees to the secondary deflecting mirror 42d side in the vertical direction. Due to the primary deflecting mirrors 40c and 42c being disposed in this way, the respective light fluxes reflected on the primary deflecting mirrors 40c and 42c are respectively incident onto the secondary deflecting mirrors 40d and 42d.

The secondary deflecting mirrors 40d and 42d are disposed so as to face the primary deflecting mirrors 40c and 42c in substantially parallel in the horizontal direction, and to cross each other at the sight from the top surface direction. Then, the secondary deflecting mirror 40d is disposed in a state of being inclined downward by several degrees to the image pickup device side in the vertical direction. In addition, the secondary deflecting mirror 42d is disposed in a state of being inclined upward by several degrees to the image pickup device side in the vertical direction. Due to the secondary deflecting mirrors 40d and 42d being disposed in this way, the respective light fluxes reflected on the secondary deflecting mirrors 40d and 42d are incident onto the image pickup unit 46.

Namely, the light flux OP1 incident from the primary deflecting mirror 40c is deflected so as to be reflected on the secondary deflecting mirror 40d to be incident into the image pickup unit 46. On the other hand, the light flux OP2 incident from the primary deflecting mirror 42c is deflected so as to be reflected on the secondary deflecting mirror 42d to be incident into the image pickup unit 46.

The image pickup unit 46 is configured to have an image pickup optical system 74 and an image pickup device 76, and obtains a parallax image 18 on the basis of a light flux incident from the stereo optical system 66.

Namely, the light flux incident via the optical system of the left side optical input unit 40 is imaged on a lower half region of the image pickup device 76 through the image pickup optical system 74. A light flux incident via the optical system of the right side optical input unit 42 is imaged on an upper half region of the image pickup device 76 through the image pickup optical system 74. Namely, the visual fields are limited by visual field masks installed on the front curvature units 40b and 42b, so that the images are imaged on the light receiving surface of the image pickup device 76 without being overlapped onto each other.

However, here, the right image is imaged on the upper half region of the image pickup device 76, and the left image is imaged on the lower half region. However, the images are imaged upside down due to the effect of the imaging lens. Then, when the relationship of the heads and tails is inverted and restored to the correct direction, a left image 18L and a right image 18R which have a parallax between the left and right are imaged so as to correspond to the upper half region and the lower half region on the light receiving surface of the image pickup device 76, as shown in FIG. 4B.

Figure 5:
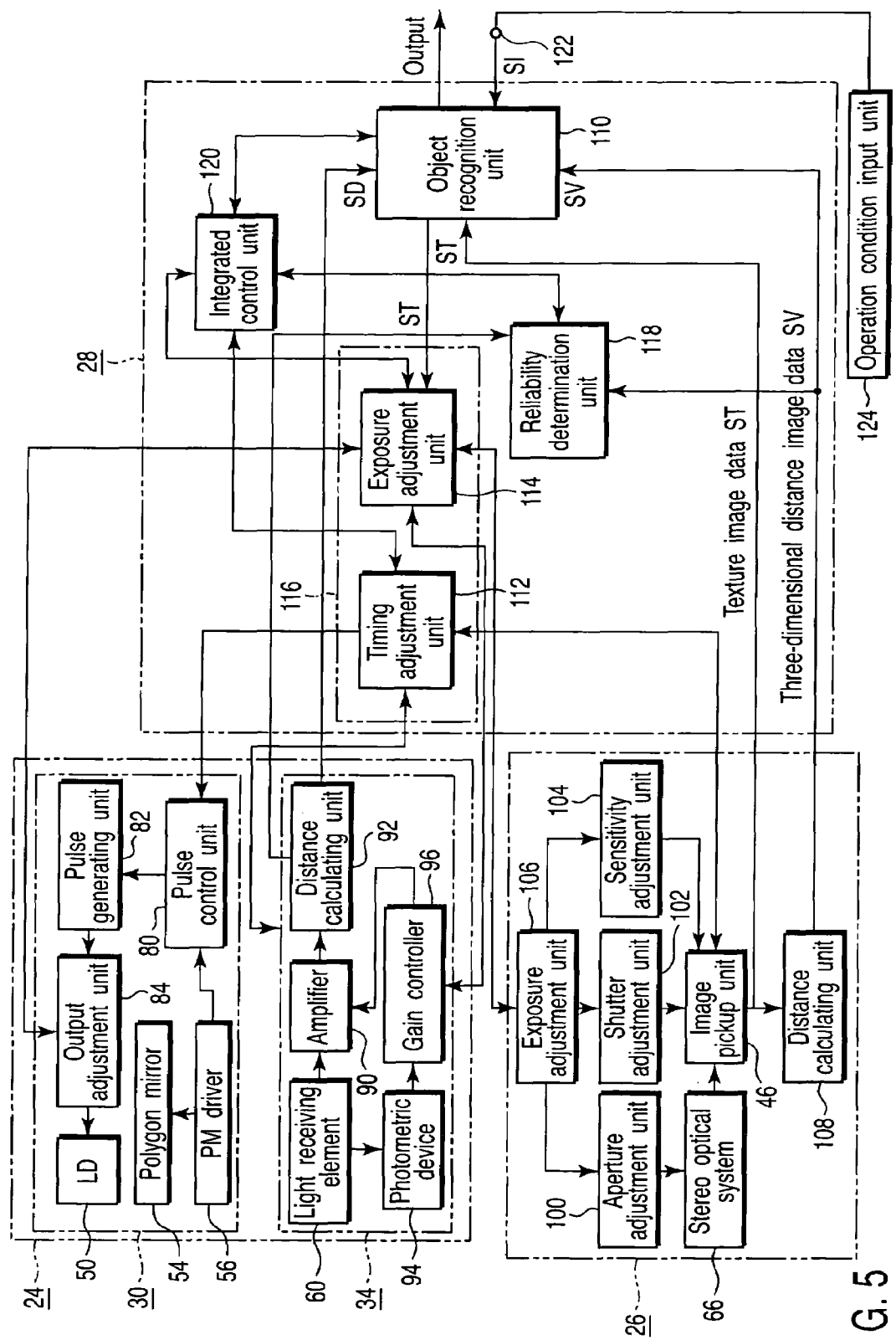
FIG. 5 is a block diagram showing an internal configuration including a control system of the object recognition apparatus according to the first embodiment of the invention.

FIG. 5 is a block diagram showing an internal configuration including a control system of the object recognition apparatus 20 according to the first embodiment of the invention.

As shown in FIG. 5, the object recognition apparatus 20 is configured to have, to broadly divided, the active range finder 24, the stereo camera 26, and a processing unit 28.

The floodlight unit 30 of the active range finder 24 is configured to include the polygon mirror 54, a polygon mirror driver (PM driver) 56, a pulse control unit 80, a pulse generating unit 82, an power control unit 84, and the laser light source (LD) 50.

The polygon mirror driver 56 is drive means for driving the polygon mirror 54. The pulse control unit 80 is to carry out pulse emission control of the laser light source 50 while synchronizing with respect to a drive pulse from the polygon mirror driver 56. The pulse generating unit 82 is to generate a light emission pulse by receiving a signal from the pulse control unit 80. The power control unit 84 is to adjust a light emission intensity with respect to an output pulse from the pulse generating unit 82. Then, the laser light source 50 is operated to emit light by a signal outputted from the power control unit 84.

The light receiving unit 34 of the active range finder 24 has, in addition to the light receiving element 60 described above, an amplifier 90, a distance calculating unit 92, a photometric device 94, a gain controller 96, and the like.

The active range finder 24 can detect a distance of a vehicle or the like which is particularly at long range by receiving a reflected light from a so-called reflector (natural lighting reflector) of a foregoing vehicle. On the other hand, the stereo camera 26 cannot detect a distance up to an object which is far away therefrom, although depending on a size of a parallax between the left and right. Accordingly, it is effective in operation support such as avoiding other vehicles parking at a comparatively long distance, for example, during driving at high speed, by using an output from the active range finder 24.

In contrast thereto, there is a feature as will be described later in the stereo camera 26. Thus, in the present embodiment, an attempt is made to finally make good use of outputs from the both detection systems for operation support by carrying out object detection by utilizing the advantages thereof in accordance with predetermined algorithm.

The stereo camera 26 has the stereo optical system 66, the image pickup unit 46, an aperture adjustment unit 100, a shutter adjustment unit 102, a sensitivity adjustment unit 104, an exposure adjustment unit 106, a distance calculating unit 108, and the like.

The image pickup unit 46 has an image pickup device 76 as described above, and the image pickup device 76 is to convert a stereo image captured by the stereo optical system 66 into an electrical signal. The aperture adjustment unit 100 is to carry out an adjustment of an aperture mechanism (not shown) inside the stereo optical unit 66. Further, the shutter adjustment unit 102 is to adjust a charge storage period of an electronic shutter inside the image pickup device 46.

The sensitivity adjustment unit 104 is to adjust a gain of an analog image signal amplifier inside the image pickup device 76. Moreover, the exposure adjustment unit 106 is to adjust the aperture adjustment unit 100, the shutter adjustment unit 102, and the sensitivity adjustment unit 104, and to carry out a so-called exposure adjustment.

The image pickup device 46 inside the stereo camera 26 has a spectral sensitivity characteristic of a visible light. The image pickup device 46 further has an available sensitivity region at which a part or all of a frequency domain of the infrared radiation floodlit from the floodlight unit 30 can be captured in order to utilize an infrared radiation floodlit from the floodlight unit 30 as a fill light of the stereo camera 26.

The sensitivity adjustment unit 104 of the stereo camera 26 is usually set so as to obtain a standard sensitivity. However, the sensitivity adjustment unit 104 can be controlled so as to be variable in accordance with image luminance information accompanying the fill light obtained by the stereo camera 26. Moreover, the stereo camera 26 periodically acquires stereo images by periodically operating the image pickup device 76 in order to acquire image information from the target object 10, carries out a distance operation with respect to the acquired stereo image at the distance calculating unit 108, and periodically determines distances up to the target object 10.

The processing unit 28 has an object recognition unit 110, a fill light control unit 116 having a timing adjustment unit 112 and an exposure adjustment unit 114, a reliability determination unit 118, an integrated control unit 120, an information input terminal 122 for inputting operation conditions, and the like.

The object recognition unit 110 in the processing unit 28 recognizes the target object 10 on the basis of a distance output signal SD from the active range finder 24, texture image data ST outputted from the image pickup unit 46 (image pickup device 76) inside the stereo camera 26, three-dimensional image data SV outputted from the distance calculating unit 108, and information SI from an operation condition input unit 124. The operation condition input unit 124 detects an operation condition of a vehicle by a driver.

Here, the texture data ST is data of a plane image, without distance information on the object, but including a luminance and color information. The three-dimensional image data SV is data showing a distribution of a distance data string corresponding to pixels of the texture image data ST without including a luminance and color information of the object.

It is possible to detect a white line on a road, and to detect a guardrail and other obstacles, on the basis of the texture image data ST and the three-dimensional distance image data SV from the stereo camera 26. Therefore, it is possible to drive while tracing a white line, and to support an operation for driving so as to avoid obstacles. This function is a function which cannot be obtained by the active range finder 24, and is a feature of the stereo camera 26.

The timing adjustment unit 112 controls a light emission timing of a pulse light emission from the laser light source 50 by receiving a control signal from the integrated control unit 120 and outputting the control signal to the pulse control unit 80 in the floodlight unit 30. Further, the timing adjustment unit 112 carries out the control of the light receiving element 60 of the light receiving unit 34, the distance calculating unit 92, and the like by outputting the control signal to the light receiving unit 34. Moreover, the timing adjustment unit 112 carries out the control of the image pickup device 46 to drive by outputting the control signal to the image pickup device 46 in the stereo camera 26.

The exposure adjustment unit 114 controls a light emission intensity of the laser light source 50 by outputting the control signal to the power control unit 84 inside the floodlight unit 30 in accordance with algorithm which will be described later on the basis of information on an object distance outputted from the object recognition unit 110 and texture image data ST from the stereo camera 26 obtained via the object recognition unit 110. The exposure adjustment unit 114 adjusts light sensitivity by outputting the control signal to the gain controller 96 inside the light receiving unit 34. Moreover, the exposure adjustment unit 114 carries out adjustments of the aperture, the electronic shutter, and the light sensitivity inside the stereo camera 26 by outputting the control signal to the exposure adjustment unit 106 inside the stereo camera 26.

The reliability determination unit 118 carries out a comparative determination on the both ranged results by comparing a ranged result from the active range finder 24 and a ranged result from the stereo camera 26. As a result of the determination, when there is a great difference between the ranged results from the both, it is determined that a failure has been brought about in the apparatus, and the reliability determination unit 118 outputs a predetermined warning signal to the exterior.

The integrated control unit 120 receives output signals from the object recognition unit 110, the timing adjustment unit 112, the exposure adjustment unit 114, and the reliability determination unit 118, and carries out entire integrated control by outputting control signals to these object recognition unit 110, timing adjustment unit 112, exposure adjustment unit 114, and reliability determination unit 118.

The fill light control unit 116 including the timing adjustment unit 112 and the exposure adjustment unit 114 has various functions as follows.

The floodlight unit 30 is controlled to operate so as to irradiate a light floodlit by the floodlight unit 30 of the active range finder 24 as a fill light of the stereo camera 26. Further, the fill light control unit 116 irradiates a light floodlit by the floodlight unit 30 of the active range finder 24, as a fill light of the stereo camera 26, onto a irradiating range W in a predetermined relationship with a visual field range V of the stereo camera 26.

The fill light control unit 116 causes the floodlight unit 30 of the active range finder 24 to operate at predetermined timings as fill light irradiating means of the stereo camera 26 with respect to imaging operations of the stereo camera 26. The fill light control unit 116 further includes means for irradiating a predetermined irradiating range in one imaging operation.

Further, the fill light control unit 116 includes means for irradiating predetermined different irradiating ranges in a plurality of imaging operations. In addition thereto, the fill light control unit 116 includes means for causing the floodlight unit 30 of the active range finder 24 to selectively operate only in specific imaging operations in a plurality of imaging operations.

Moreover, the fill light control unit 116 controls the floodlight unit 30 on the basis of image information obtained from the stereo camera 26. Further, the fill light control unit 116 carries out the control for on/off of the floodlight unit 30 in accordance with the image information obtained from the stereo camera 26. Moreover, the fill light control unit 116 carries out the control for light intensity of the floodlight unit 30 in accordance with the image information obtained from the stereo camera 26.

The fill light control unit 116 carries out the conditioned control of light intensity of the floodlight unit 30 such that a luminance at an objective region is fallen into a predetermined luminance range in accordance with the image information obtained from the stereo camera 26. The fill light control unit 116 further includes means for turning the floodlight unit 30 off, or reducing the light intensity when it is determined that there is a possibility that a person exists in an objective region in accordance with the image information obtained from the stereo camera 26.

In addition, the fill light control unit 116 includes means for controlling a size of a floodlight spot from the floodlight unit 30 in accordance with the image information obtained from the stereo camera 26. Moreover, the fill light control unit 116 includes means for controlling the irradiating range W by the floodlight unit 30 in accordance with the image information obtained from the stereo camera 26.

The fill light control unit 116 includes means for gradually enhancing the floodlight unit 30 from being in an off-state or in a sate in which the light intensity is comparatively weak to being in a state in which the light intensity is comparatively strong when the means starts to operate.

The fill light control unit 116 includes means for controlling the floodlight unit 30 in accordance with the luminance information obtained from the stereo camera 26. Additionally, the fill light control unit 116 includes means for controlling the floodlight unit 30, and for adjusting light sensitivity of the stereo camera 26 in accordance with the image information obtained from the stereo camera 26.

Moreover, the fill light control unit 116 includes means for determining an irradiating range W of the floodlight unit 30 on the basis of an operation condition (for example, a rudder angle of a steering wheel) of the vehicle 12 inputted by the operation condition input unit 124.

Note that the present apparatus 20 has the following functions in addition to those described above.

Namely, the apparatus 20 has an adjustment unit for a fill light irradiating range in which a range W on which a light floodlit by the floodlight unit 30 of the active range finder 24 is irradiated as a fill light of the stereo camera 26 is adjusted with respect to a visual field range V of the stereo camera 26 or a reference position of the visual field range V.

The apparatus 20 further has a calibration execution unit which carries out calibration of a ranged result from the stereo camera 26 on the basis of a ranged result from the active range finder 24. In the optical system of the stereo camera 26, an accurate optical adjustment has been carried out. However, when it has been used for a long period, an error might be brought about in a ranged result with time due to vibration or the like.

A ranging method of the active range finder 24 is to range by measuring a period from a time light emission from the laser light source 50 is carried out up to a time a light reflected on the target object 10 returns thereto. Accordingly, a change over time is hardly brought about as compared with the stereo camera 26, and the measured values are stable. Accordingly, the calibration is preferably carried out periodically or every time the power source of the object recognition apparatus is turned on.

Further, the present apparatus 20 has a floodlight control unit constituted by the gain controller 96 and the integrated control unit 120. The floodlight control unit causes the floodlight unit 30 to operate in order to irradiate a fill light of the stereo camera 26 during an operating cycle of the image pickup device 76 in the image pickup unit 46, and within a period of time charge storage is carried out. In addition, except that the period of time charge storage is carried out, the floodlight control unit causes the floodlight unit 30 to operate in order to obtain ranged data as the active range finder 24.

Hereinafter, the operation and the effect of the first embodiment described above will be described.

Figure 6:
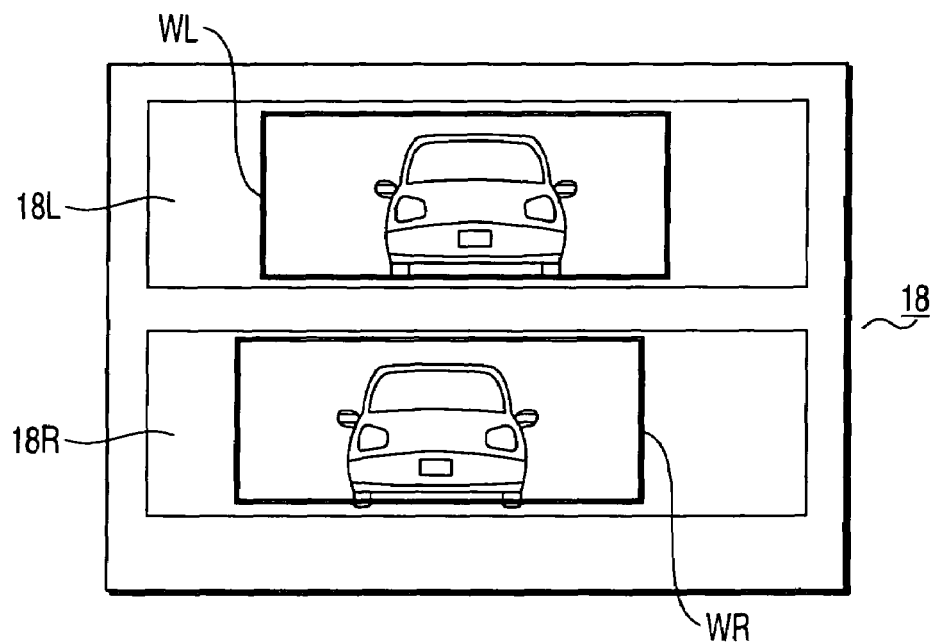
FIG. 6 is a view showing active projection irradiating ranges WL and WR of a stereo image obtained in the object recognition apparatus according to the first embodiment of the invention.
Figure 7:
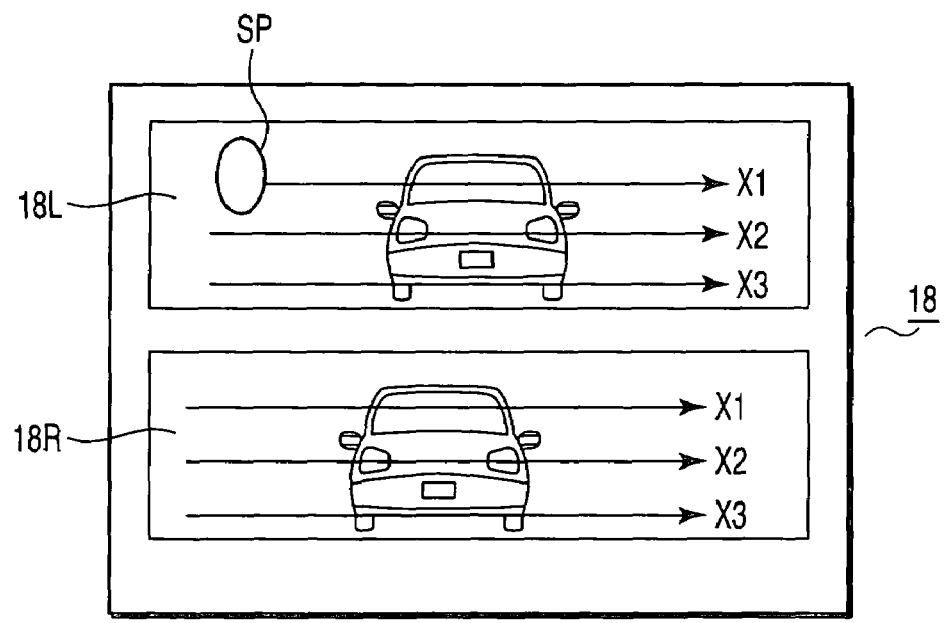
FIG. 7 is a view showing a scanning situation by an active projection irradiation spot SP of a stereo image obtained in the object recognition apparatus according to the first embodiment of the invention.

FIG. 6 shows the stereo image 18 (the left image 18L, the right image 18R) obtained at the object recognition apparatus 20, and is a view showing active projection irradiating ranges WL and WR. FIG. 7 shows the stereo image 18 (the left image 18L, the right image 18R) obtained at the object recognition apparatus 20, and is a view showing a scanning situation by an active projection irradiation spot SP. In FIG. 7, arrows X1, X2, X3, . . . show horizontal scanning lines by the respective inclined reflection surfaces of the polygon mirror 54.

FIGS. 8 and 9A to 9C are illustrations with respect to adjustment for left and right irradiating ranges of a light irradiated as a fill light of the stereo camera 26 from the laser light source 50.

Figure 8:
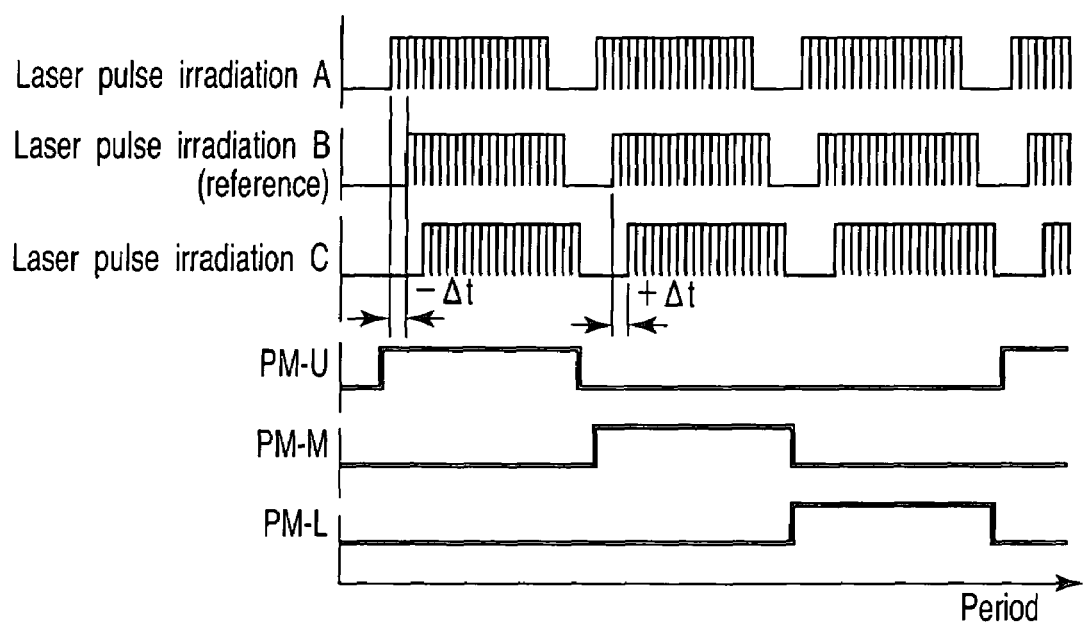
FIG. 8 is an explanatory view with respect to an adjustment of left and right irradiating ranges of a light irradiated as a fill light of the stereo camera from a laser light source in the object recognition apparatus according to the first embodiment of the invention, the view showing a relationship among rotational operations of respective inclined reflection surfaces of the polygon mirror and timings of pulsed laser irradiations.

FIG. 8 shows a relationship between rotational operations of three inclined reflection surfaces (PM-U, PM-M, PM-L) of the polygon mirror 54 and timings of pulsed laser irradiations A, B, and C. Here, PM-U corresponds to U1 or U2 shown in FIG. 3C, PM-M corresponds to M1 or M2 shown in FIG. 3C, and PM-L corresponds to L1 or L2 shown in FIG. 3C.

Figure 9A:
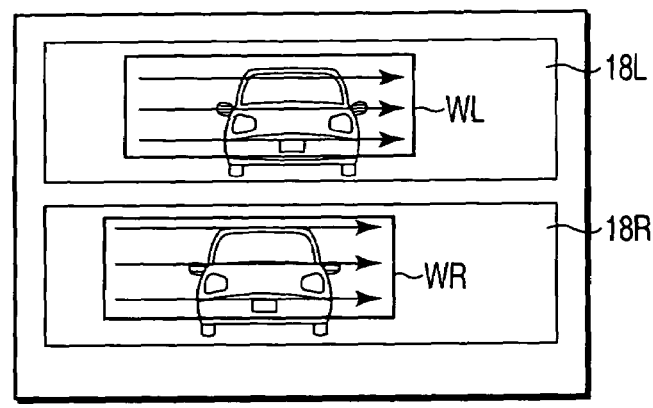
FIG. 9A is an explanatory view with respect to an adjustment of the left and right irradiating ranges of a light irradiated as a fill light of the stereo camera from the laser light source in the object recognition apparatus according to the first embodiment of the invention, the view showing a state in which a light emission scanning range as a fill light is shifted to the left side.
Figure 9B:
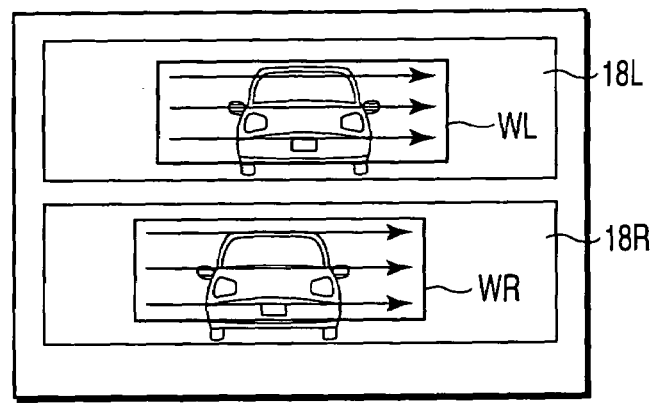
FIG. 9B is an explanatory view with respect to an adjustment of the left and right irradiating ranges of a light irradiated as a fill light of the stereo camera from a laser light source in the object recognition apparatus according to the first embodiment of the invention, the view showing a reference state of a light emission scanning range as a fill light.

The pulsed laser irradiation B shows a reference light emission timing of the laser light source 50. The laser light source 50 carries out pulse light emissions at predetermined timings so as to be synchronized with the rotation cycles of the respective inclined reflection surfaces of the polygon mirror 54. As a result, as shown in FIG. 9B, the laser light source 50 carries out light emission scanning as a fill light at predetermined irradiating ranges W (WL, WR) with respect to a detected visual field of the stereo camera 26.

Figure 9C:
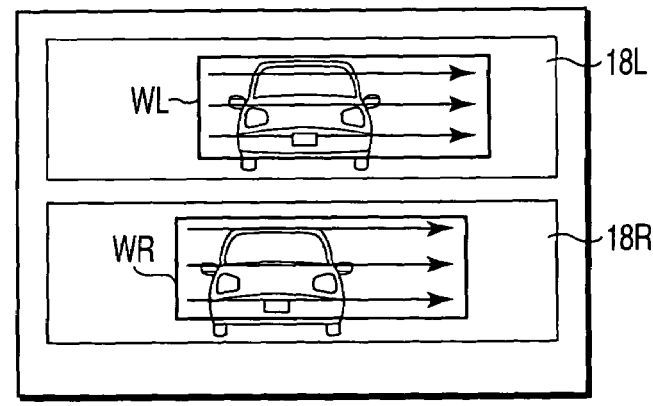
FIG. 9C is an explanatory view with respect to an adjustment of the left and right irradiating ranges of a light irradiated as a fill light of the stereo camera from a laser light source in the object recognition apparatus according to the first embodiment of the invention, the view showing a state in which a light emission scanning range as a fill light is shifted to the right side.

Here, it is sufficient that the floodlight unit 30, in particular, the laser light source 50 is accurately attached to the detected visual field of the stereo camera 26. However, in other cases, as shown in FIG. 9A or 9C, the scanning ranges as a fill light are shifted. In a case where the scanning ranges are shifted to the right side as shown in FIG. 9C, a light emission timing of the laser light source 50 is put ahead by $\Delta t$ from the reference, as shown in the pulsed laser irradiation A in FIG. 8. In this way, as a result, the case is made as that shown in FIG. 9B.

In a case where the scanning ranges are shifted to the left side as shown in FIG. 9A, a light emission timing of the laser light source 50 is set back by $\Delta t$, as shown in the pulsed laser irradiation C in FIG. 8. In this way, as a result, the case is made as that shown in FIG. 9B. The aforementioned adjustment is an adjustment available in the same way as in a case of using the laser light source 50, not only as a fill light of the stereo camera 26, but also as an active range finder in itself.

Figure 10:
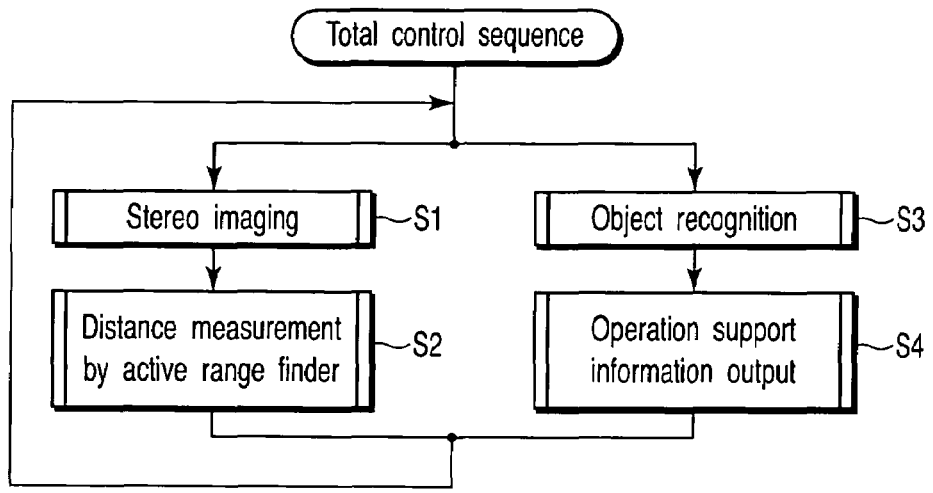
FIG. 10 is a flowchart showing a total control sequence executed by an integrated control unit of the object recognition apparatus according to the first embodiment of the invention.

FIG. 10 is a flowchart showing a total control sequence executed by the integrated control unit 120.

Stereo imaging in step S1 and ranging at the active range finder 24 in step S2 are, as one set, carried out at a frequency of 30 times/second by the integrated control unit 120. Namely, with one cycle being about 33 msec, the processing in step S1 is executed at the front half thereof, and the processing in step S2 is executed at the last half.

Further, sequences of object recognition in step S3 and of operation support information output in step S4 are carried out in parallel with the sequences in the steps S1 and S2. These steps S3 and S4 are carried out by using the results in the steps S1 and S2 determined due to a loop of the past such as the last time, or the last but one.

Figure 11:
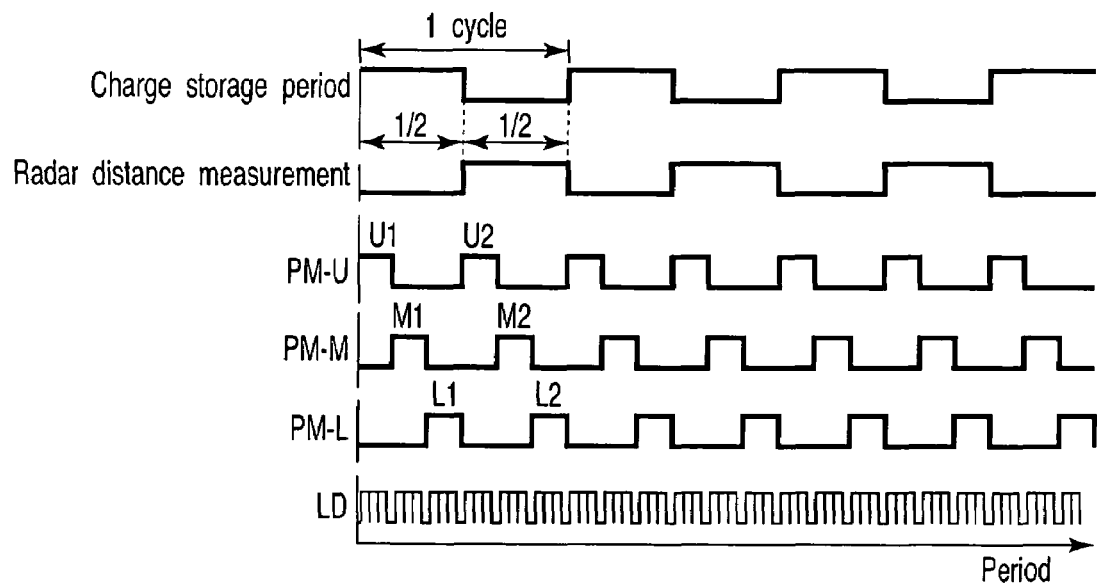
FIG. 11 is a timing chart showing charge storage periods of an image pickup device at sequences in steps S1 and S2 in the flowchart of FIG. 10, movements on the inclined reflection surfaces of the polygon mirror, and timings of light emission pulse irradiations of a laser light source (LD).

FIG. 11 is a timing chart showing charge storage periods of the image pickup device 76 in the sequences in the steps S1 and S2, movements on the inclined reflection surfaces of the polygon mirror 54, and timings of the light emission pulse irradiations of the laser light source (LD) 50. As illustrated, charge storage accompanying fill light irradiations from the respective inclined reflecting surfaces (PM-U1, PM-M1, PM-L1) of the polygon mirror 54 are carried out at ½ cycles in the front half of one imaging operation (1 cycle). Subsequently, in the last half, ranging operations as the active range finder 24 by floodlighting laser beams from the respective inclined reflecting surfaces (PM-U2, PM-M2, PM-L2) of the polygon mirror 54 are carried.

The laser light source (LD) 50 is caused to operate to emit light in timings as shown in FIG. 11, so that, as shown in FIG. 9B, it is possible to carry out ranging by irradiating a fill light within a predetermined range in the visual field of the stereo camera 26, and irradiating a laser beam within a predetermined range as the active range finder 24.

The sequence of stereo imaging in the step S1 will be further described in detail by using a subroutine of FIG. 12 and a table shown in FIG. 13.

First, in step S11, it is determined whether a high luminance or not. Here, under the conditions that a shutter opening period (charge storage period) is 15 msec which is a maximum length, that an aperture is a minimum aperture, and that sensitivity setting of the image pickup device 76 is minimum sensitivity, it is determined high luminance when the luminance is a luminance by which the outputs from the image pickup device 76 are saturated. Accordingly, the routine proceeds to step S12, and high luminance control is carried out.

In the high luminance control in step S12, a shutter opening period is controlled so as to be variable in accordance with a luminance between 15 msec which is a maximum second time to 1 μsec which is a minimum second time, as shown in the X item of FIG. 13. An aperture is fixed to a minimum aperture. Sensitivity setting of the image pickup device 76 is fixed to minimum sensitivity. Suppose that there is no fill light by the laser light source 50 (OFF).

Here, the shutter opening period is controlled to be adjusted by giving feedback to each stereo imaging such that a MAX value of image data obtained from the image pickup device 76 is fallen in a range of 70 to 100% of a saturation level.

When it is determined not high luminance in the step S11, the routine proceeds to step S13, in which it is determined whether a low luminance or not. Here, under the conditions that a shutter opening period (charge storage period) is 15 msec which is a maximum length, that an aperture is a maximum aperture, and that sensitivity setting of the image pickup device 76 is minimum sensitivity, it is determined a low luminance when the output from the image pickup device 76 is 70% or less of a saturation level, and low luminance control in step S15 is carried out. In other cases, it is determined a medium luminance, and the routine proceeds to step S14, in which medium luminance control is carried out.

In the medium luminance control in step S14, a shutter opening period is fixed to 15 msec which is a maximum second time, as shown in the Y item of FIG. 13. An aperture is controlled so as to be variable in accordance with a luminance between a minimum aperture and a maximum aperture. Sensitivity setting of the image pickup device 76 is fixed to minimum sensitivity. Suppose that there is a fill light by the laser light source 50 (ON).

The emission intensity of the laser light source 50 is controlled to be adjusted in accordance with a distance up to the target object 10 and a controlled value of the aperture so as to be a fill light appropriate to the target object 10. Here, the aperture is controlled to be adjusted by giving feedback from each stereo imaging to following stereo imaging such that a MAX value of image data obtained from the image pickup device 76 is fallen in a range of 70 to 100% of a saturation level.

In the low luminance control in step S15, a shutter opening period is fixed to 15 msec which is a maximum second time, as shown in the Z item of FIG. 13. An aperture is fixed to a maximum aperture. Sensitivity setting of the image pickup device 76 is controlled so as to be variable in accordance with a luminance between minimum sensitivity and maximum sensitivity. Suppose that there is a fill light by the laser (ON). The emission intensity of the laser light source 50 is controlled to be adjusted in accordance with a distance up to the target object 10 and a controlled value of the sensitivity setting of the image pickup device 76 so as to be a fill light appropriate to the target object 10.

Here, the sensitivity setting of the image pickup device 76 is controlled to be adjusted by giving feedback from each stereo imaging result to following stereo imaging such that a MAX value of image data obtained from the image pickup device 76 is fallen in a range of 70 to 100% of a saturation level.

Note that, as the conditioned control, exposure control, which is in the same way as in aperture priority, shutter speed priority, aperture or shutter speed priority, and the like at the time of general video camera photographing, may be carried out.

As described above, the conditioned control of a shutter opening period, the conditioned control of an aperture, the conditioned control for sensitivity setting of the image pickup device 76, the conditioned control of an emission intensity of the laser light source 50, and the like are carried out appropriately in accordance with an output from the image pickup device 76 in the stereo camera 26.

Second Embodiment

Next, a second embodiment of the present invention will be described.

Figure 14A:
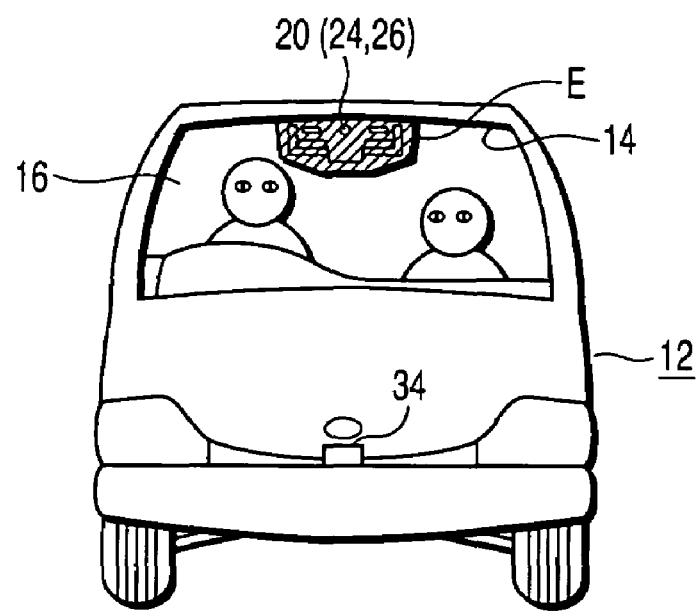
FIG. 14A is a view showing a configuration of an object recognition apparatus according to a second embodiment of the present invention, the view being shown so as to correspond to FIG. 1A.
Figure 14B:
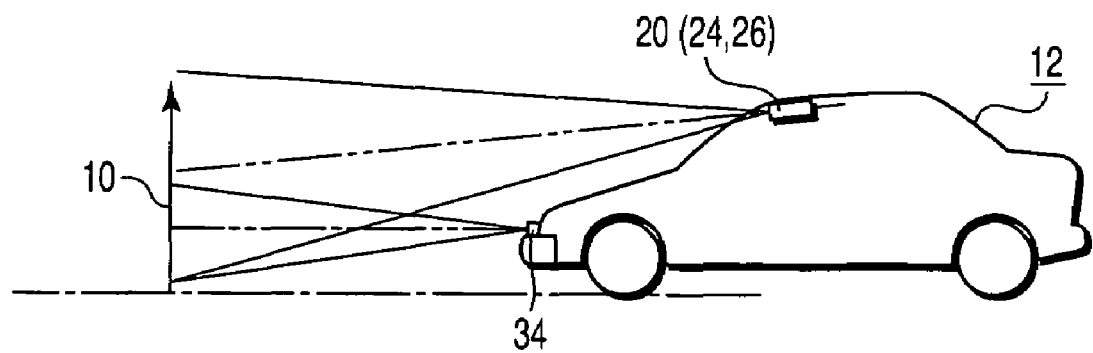
FIG. 14B is a view showing a configuration of the object recognition apparatus according to the second embodiment of the invention, the view being shown so as to correspond to FIG. 1B.
Figure 15:
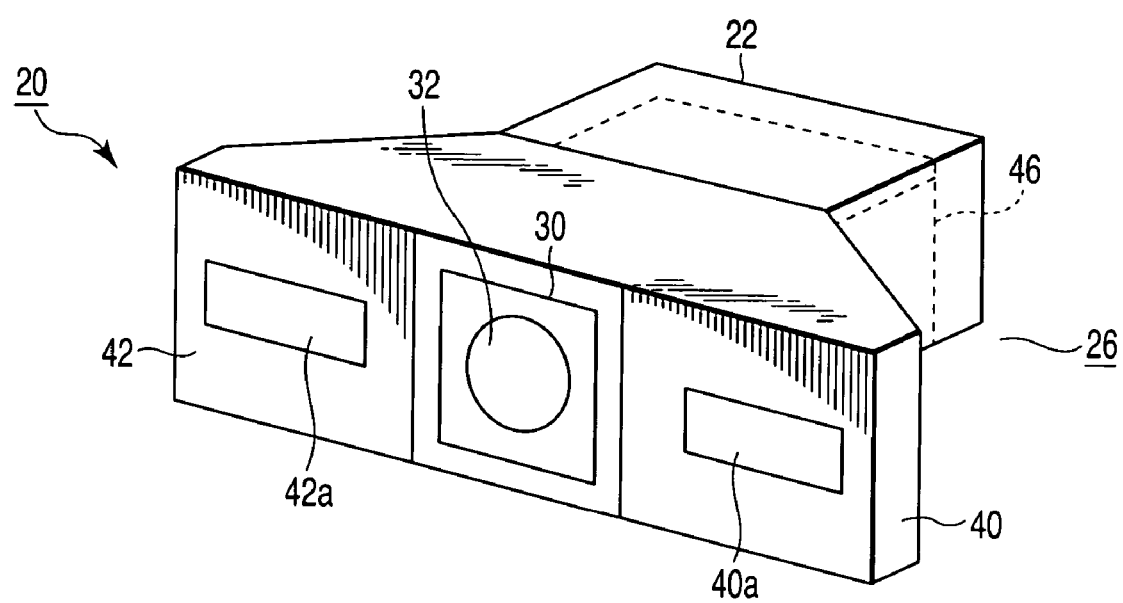
FIG. 15 is an exterior appearance perspective view showing a configuration of the object recognition apparatus according to the second embodiment of the invention, the view being shown so as to correspond to FIG. 2.

FIGS. 14A, 14B and 15 show configurations of an object recognition apparatus 20 according to the second embodiment of the invention, the figures being shown so as to correspond to FIGS. 1A, 1B and 2, respectively.

The configurations of the object recognition apparatus in the second embodiment and embodiments described hereinafter are the same as those in the first embodiment. Therefore, only different configurations and operations will be described, the other portions which are the same as those are denoted by same reference numerals, and illustrations and descriptions thereof will be omitted.

The second embodiment is different from the first embodiment in that only the floodlight unit 30 of the active range finder 24 is installed in the vehicle so as to be integrated with the stereo camera 26, and that the light receiving unit 34 of the active range finder 24 is installed in the vicinity of the front bumper of the vehicle. In such an embodiment, an object of the present invention can be achieved.

Third Embodiment

Next, a third embodiment of the present invention will be described.

Figure 16:
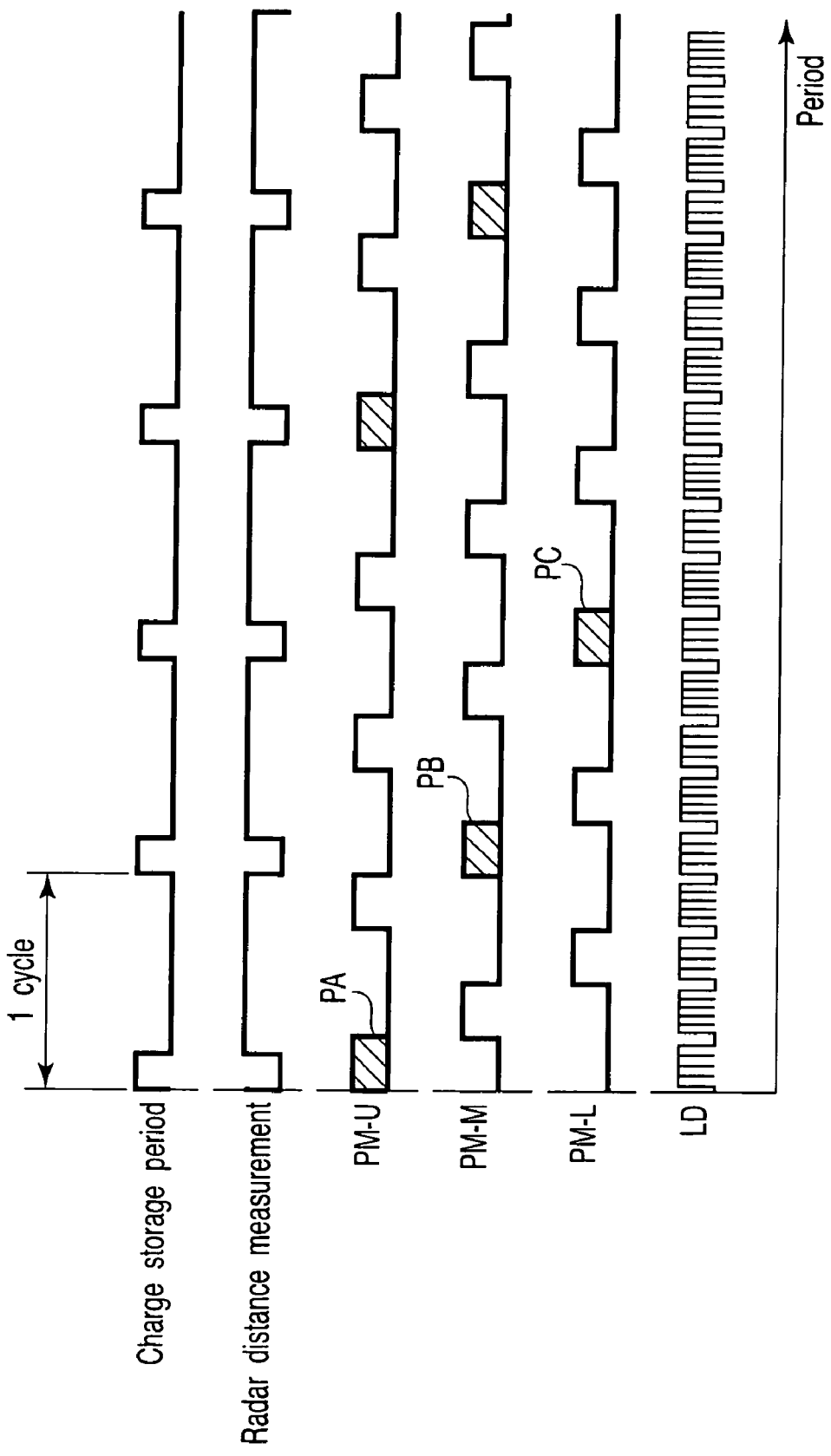
FIG. 16 shows an operation of an object recognition apparatus according to a third embodiment of the present invention, and is a timing chart showing charge storage periods of an image pickup device, movements on inclined reflection surfaces of a polygon mirror, and timings of light emission pulse irradiations of a laser light source (LD).

FIG. 16 shows an operation of an object recognition apparatus according to the third embodiment of the invention, and is a timing chart showing charge storage periods of the image pickup device 76, movements on the inclined reflection surfaces of the polygon mirror 54, and timings of the light emission pulse irradiations of the laser light source (LD). FIGS. 17A to 17C are views showing a relationship among stereo images obtained by photographing three times by the object recognition apparatus 20 according to the present embodiment, and active projection irradiating ranges WL and WR.

The third embodiment is an embodiment corresponding to a case where the working speed of the polygon mirror 54 is not high as that in the first embodiment described above, and hexahedral driving of the polygon mirror 54 cannot be achieved, but only tetrahedral driving thereof can be achieved during one cycle. In this case, it is impossible to set a shutter second time to about 15 msec as in the first embodiment. This is an example in which, under the photographing condition that a shutter speed is high, and a charge storage period is short less than or equal to ¼ of one cycle, a photographing operation is carried out so as to be divided into a plurality of times (three times in the present embodiment) in accordance with the light emission scanning speed of the polygon mirror 54, and one required image is obtained by synthesizing photographed images thereby.

In FIG. 16, shaded areas PA, PB, and PC show timings for photographing due to fill light irradiations. As shown in FIGS. 17A, 17B and 17C, the active projection irradiating ranges WL and WR are sequentially shifted downward so as to correspond to a plurality of times (three times in the present embodiment) of photographing operations shown in FIGS. 17A, 17B, 17C, . . . .

Fourth Embodiment

Next, a fourth embodiment of the present invention will be described.

Figure 18:
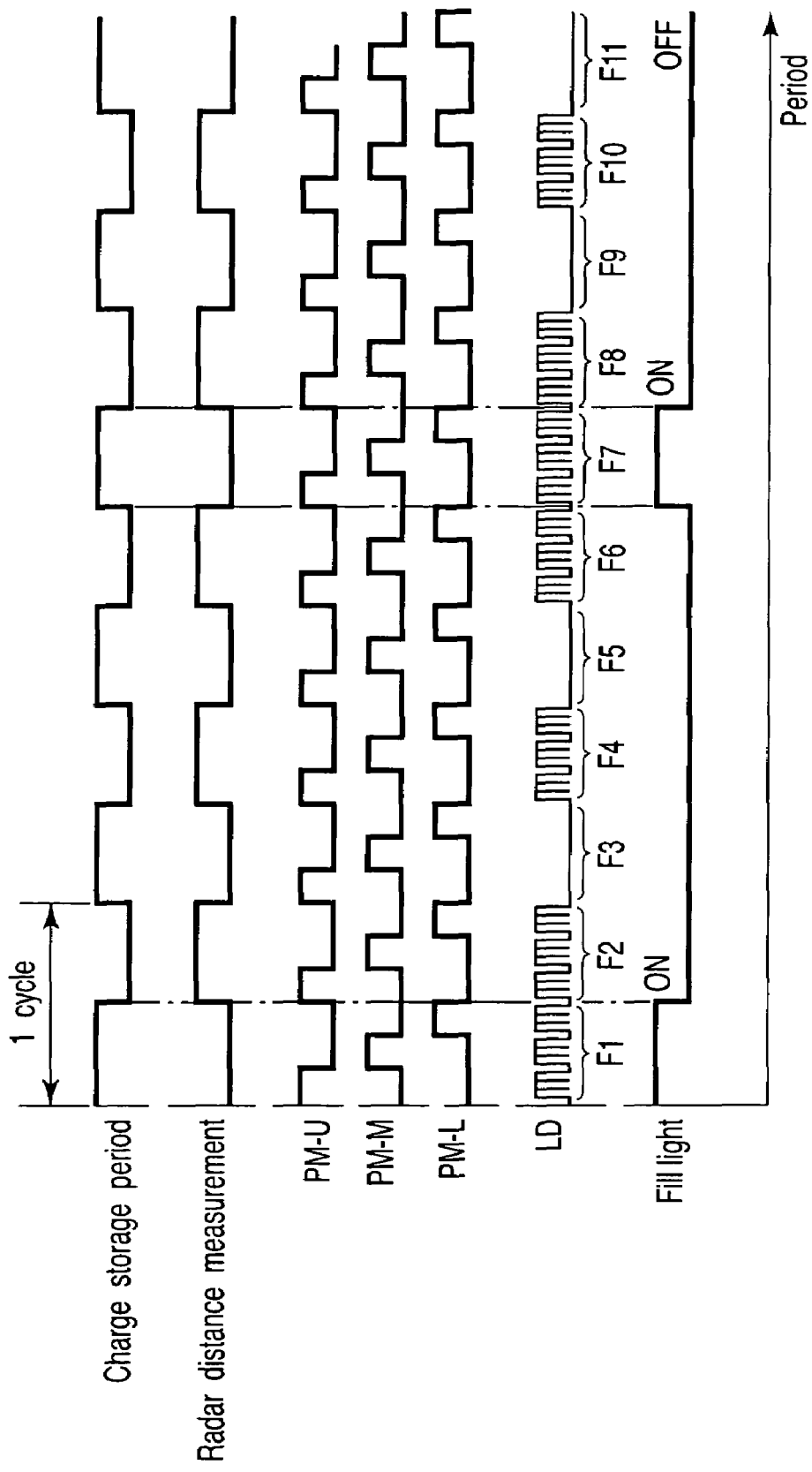
FIG. 18 shows an operation of an object recognition apparatus according to a fourth embodiment of the present invention, and is a timing chart showing charge storage periods of an image pickup device, movements on inclined reflection surfaces of a polygon mirror, and timings of light emission pulse irradiations of a laser light source (LD).

FIG. 18 shows an operation of an object recognition apparatus according to the fourth embodiment of the invention, and is a timing chart showing charge storage periods of the image pickup device 76, movements on the inclined reflection surfaces of the polygon mirror, and timings of the light emission pulse irradiations of the laser light source (LD).

The fourth embodiment is different from the first embodiment in that a fill light is turned on at a rate of once per three times of stereo imaging.

Namely, as shown in FIG. 18, a fill light is turned on at periods in which stereo imaging are carried out (charge storage periods) F1, F7, . . . . In periods F3, F5, F9, and F11, the laser beam is turned off. The laser light source 50 serving as the active range finder 24 does not operate at intervals, but operates respectively in periods F2, F4, F6, F10, . . . .

Fifth Embodiment

Figure 19:
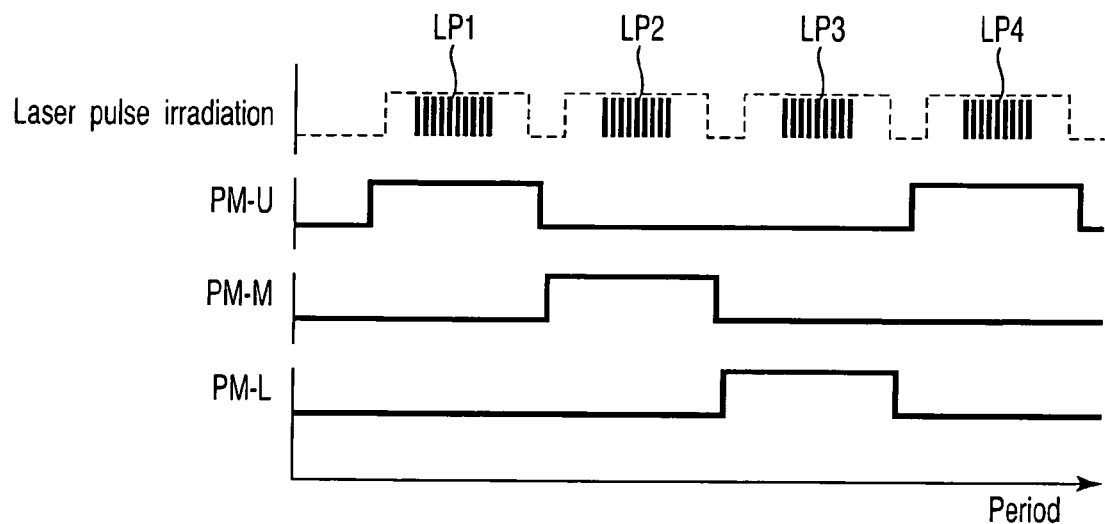
FIG. 19 shows an operation of an object recognition apparatus according to a fifth embodiment of the present invention, and is a timing chart showing a correspondence among irradiation timings of laser pulses and rotation cycles of respective inclined reflection surfaces of a polygon mirror.
Figure 20:
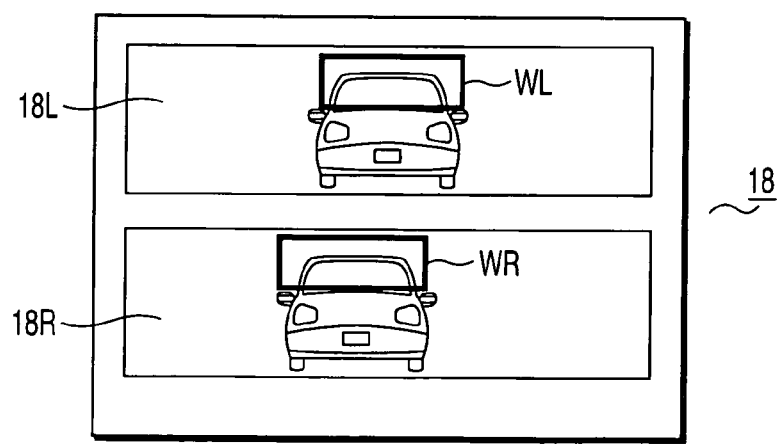
FIG. 20 is a view showing a relationship among stereo images obtained in the object recognition apparatus according to the fifth embodiment of the invention and the active projection irradiating ranges WL and WR.

FIG. 19 shows an operation of an object recognition apparatus according to a fifth embodiment of the present invention, and is a timing chart showing a relationship of correspondence among irradiation timings of laser pulses LP1, LP2, LP3, LP4, . . . , and rotational cycles of the respective inclined reflection surfaces (PM-U, PM-M, PM-L) of the polygon mirror. FIG. 20 is a view showing active projection irradiating ranges WL and WR on the stereo image 18 when the laser pulses LP1, LP2, LP3, LP4, . . . are irradiated at the timings shown in FIG. 19.

The fifth embodiment is different from the first embodiment in that, when it is determined that a target object in the stereo image data is a part in the visual field range of the stereo camera 26, a fill light is irradiated onto only the limited part.

As shown in FIG. 19, the irradiation widths of the laser pulses LP1, LP2, LP3, LP4, . . . emitted from the floodlight unit 30 are narrower than those in ordinary cases. As shown in FIG. 19, the active projection irradiating ranges WL and WR are limited to the upper regions of the respective stereo images 18L and 18R.

Sixth Embodiment

FIG. 21 shows an operation of an object recognition apparatus according to a sixth embodiment of the present invention, and is a timing chart showing a relationship of correspondence among irradiation timings of laser pulses LP1, LP2, LP3, LP4, . . . , and rotational cycles of the respective inclined reflection surfaces (PM-U, PM-M, PM-L) of the polygon mirror 54. FIG. 22A is a view showing a relationship among stereo images obtained by the object recognition apparatus according to the embodiment, and active projection irradiating ranges WL and WR, and FIG. 22B is a schematic view showing an operating direction of a rudder angle of a steering wheel corresponding to FIG. 22A.

The sixth embodiment is different from the first embodiment in that a fill light is irradiated onto a limited range in accordance with information SI inputted via an input terminal 122 from operation condition input means (not shown). The operation condition input unit 124 inputs a rudder angle of the steering wheel of the automobile, and for example, when the steering wheel H is turned to the right direction as shown in FIG. 22B, it is determined that the target object 10 to be a target is on the right side of the visual field of the stereo camera 24. It is configured such that the fill light irradiating ranges WL and WR are moved to the regions which have been shifted to the right side as shown in FIG. 22A in accordance with the rudder angle of the steering wheel.

Seventh Embodiment

Next, a seventh embodiment of the present invention will be described.

FIGS. 23A and 23B are views showing a relationship among stereo images obtained by an object recognition apparatus according to the seventh embodiment of the invention, and active projection irradiating ranges WL and WR, where FIG. 23A is a view in an ordinary case, and FIG. 23B is a view in a case of emitting light so as to insert a cylindrical lens and to make a cycle of emission pulse short.

The seventh embodiment is different from the first embodiment in that it is possible to insert a cylindrical lens (not shown) which can be inserted and demounted between the laser light source 50 and the polygon mirror 54. In the ordinary case, the cylindrical lens is not inserted in front of the laser light source 50, and a circular laser beam flux is emitted. As a result, as shown in FIG. 23A, a fill light is irradiated onto standard irradiating ranges WL and WR.

For example, when the target object 10 is at a long distance, and a strong fill light is required, a cylindrical lens is inserted in front of the laser light source 50, a fill light is emitted such that a laser beam flux is deformed so as to be elongated in the vertical direction, and a cycle of emission pulses from the laser light source 50 is shortened. As a result, as shown in FIG. 23B, a fill light is irradiated onto the irradiating ranges WLb and WRb which are narrower than standard irradiating ranges WLa and WRa. In this way, it is possible to efficiently irradiate a fill light onto the target object 10 which is at a long distance.

Although the cylindrical lens is inserted between the laser light source 50 and the polygon mirror 54 in the seventh embodiment, the cylindrical lens may be inserted at the light emission side of the polygon mirror 54. In this case, the same effect can be obtained only by inserting and demounting the cylindrical lens, even without a cycle of light emission pulses of the laser light source 50 being changed.

Eighth Embodiment

Figure 24:
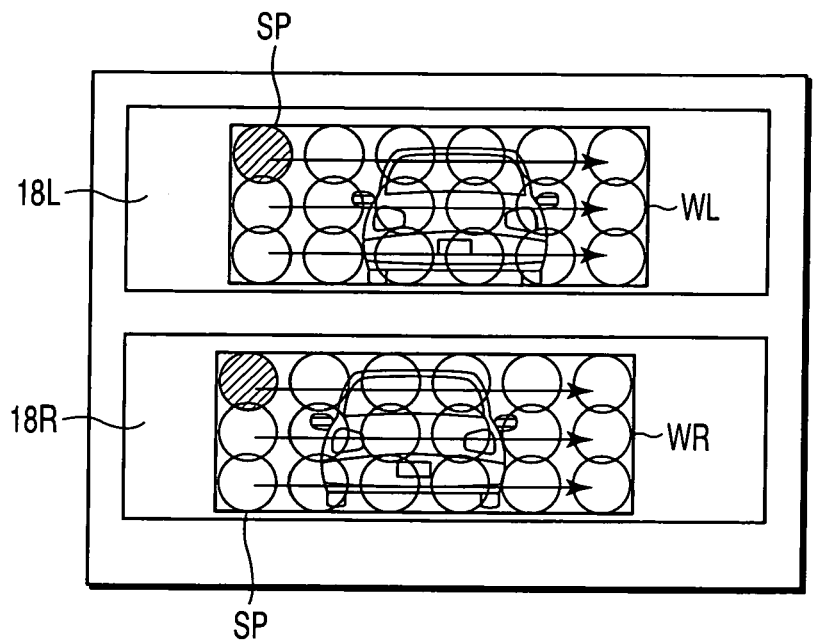
FIG. 24 is a view showing a relationship among stereo images obtained in an object recognition apparatus according to an eighth embodiment of the present invention and the active projection irradiating ranges WL and WR.

FIG. 24 is a view showing a relationship among stereo images obtained by an object recognition apparatus according to an eighth embodiment of the present invention, and active projection irradiating ranges WL and WR.

The eighth embodiment is different from the first embodiment in that an effect of increasing contrast on the target object is improved by further increasing unevenness of irradiation of a fill light. Namely, as shown in FIG. 24, when the laser light source 50 is operated as means for irradiating a fill light of the stereo camera 26, intervals among respective light emission pulses are made broader by making a light emission cycle longer than a standard cycle.

In this manner, unevenness of irradiation brought about on the surface of the target object 10 is made more apparent, and an effect of increasing contrast on the target object 10 is improved.

Ninth Embodiment

Figure 25:
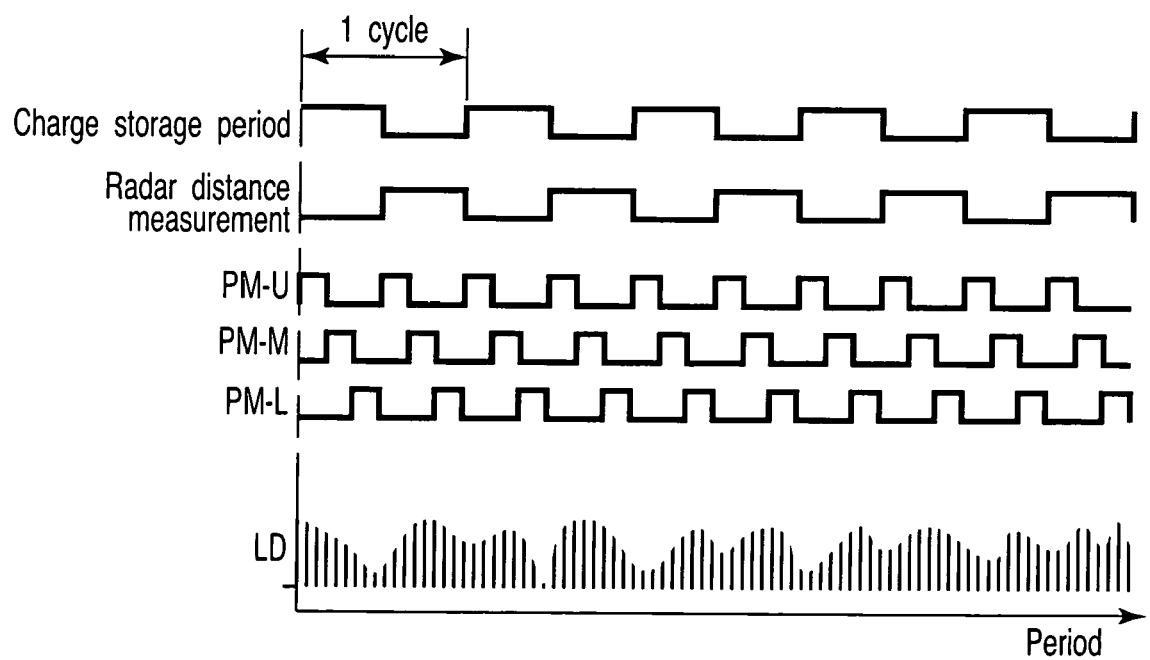
FIG. 25 shows an operation of an object recognition apparatus according to a ninth embodiment of the present invention, and is a timing chart showing charge storage periods of an image pickup device, movements on inclined reflection surfaces of a polygon mirror, and timings of light emission pulse irradiations of a laser light source (LD).

FIG. 25 shows an operation of an object recognition apparatus according to a ninth embodiment of the present invention, and is a timing chart showing charge storage periods of the image pickup device, movements on the inclined reflection surfaces of the polygon mirror, and timings of the light emission pulse irradiations of the laser light source (LD).

The ninth embodiment is different from the first embodiment in that unevenness of irradiation is brought about on the target object 10 by modulating an intensity of pulse light emission emitted from the laser light source 50.

Namely, it is the same as FIG. 23A in the point that a laser beam is irradiated without a break as a fill light of the stereo camera 26. However, as shown in FIG. 25, pulse light emission whose intensity is changed randomly is irradiated onto the target object 10.

According to the present embodiment, it is the same as in the eighth embodiment described above in the point that the effect of increasing contrast on the target object 10 is improved. In addition thereto, because unevenness of irradiation brought about on the target object 10 is not made periodical, the risk of error in ranging is little.

By comparison, the ranging method of the stereo camera 26 is to utilize a parallax between the left and right. Thus, when unevenness of irradiation is periodical, an accurate detection is not carried out, which results in the risk of error in ranging.

Tenth Embodiment

Next, a tenth embodiment of the present invention will be described.

Figure 26:
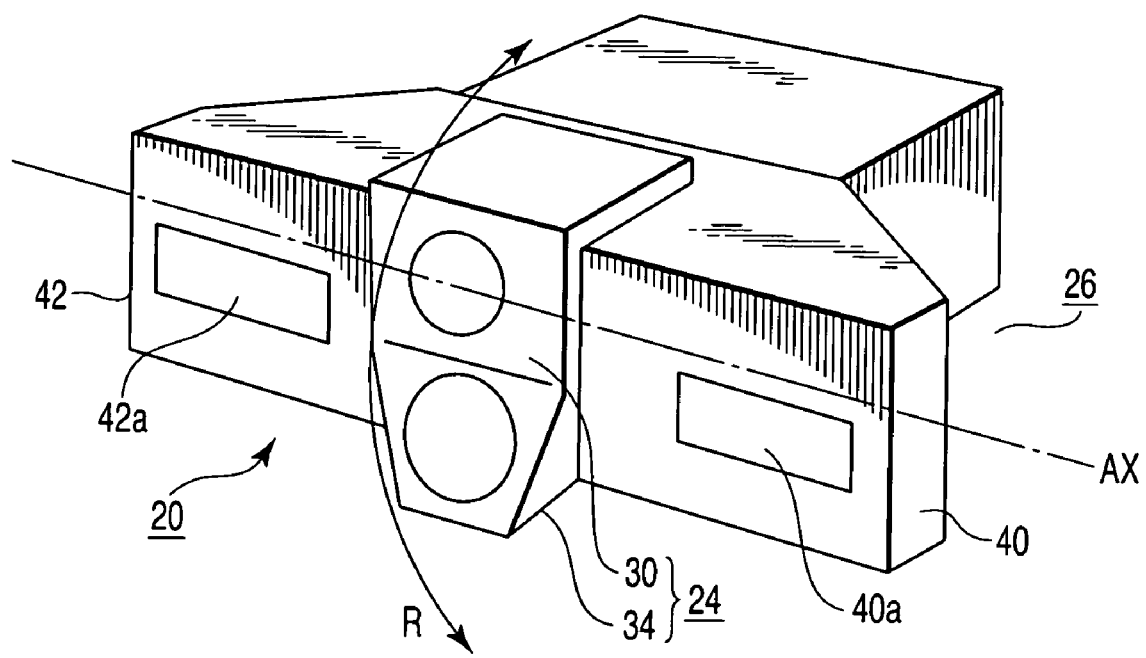
FIG. 26 is an exterior appearance perspective view showing a configuration of an object recognition apparatus according to a tenth embodiment of the present invention.

FIG. 26 is an exterior appearance perspective view showing a configuration of an object recognition apparatus according to the tenth embodiment of the invention.

The tenth embodiment is different from the first embodiment in that, as shown in FIG. 26, there is provided an adjustment mechanism in which the entire active range finder 24 in which the floodlight unit 30 and the light receiving unit 34 are integrated can be rotated so as to be freely elevated centering on the rotating axis AX as shown by the arrow R, and the vertical direction of the irradiating range W is made adjustable up and down. Note that the rotating axis AX is provided along the line connecting the left visual field opening 40a and the right visual field opening 42a.

Characteristics in the Embodiments

[1] An object recognition apparatus described in the embodiment comprises:
an active range finder 24 having a floodlight unit 30 which floodlights a light onto a target object, and determines a distance up to a target object on the basis of a reflected light therefrom;
a stereo camera 26 to determine a distance up to the target object on the basis of image information from the target object;
an object recognition unit 110 which recognizes the target object on the basis of an output signal S1 from the active range finder 24 and an output signal S2 from the stereo camera 26; and
a fill light control unit 116 which controls the floodlight unit 30 to operate so as to irradiate a light floodlit by the floodlight unit 30 of the active range finder 24 as a fill light of the stereo camera 26.

In the object recognition apparatus, the floodlight unit 30 of the active range finder 24 is used as a fill light of the stereo camera 26 in the apparatus having two type of ranging units which are the active range finder 24 and the stereo camera 26. Therefore, even under the condition that the environment is dark, an appropriate stereo image can be obtained without a dedicated fill light irradiation unit being provided in particular. Additionally, the apparatus can be formed so as to be compact, and can be manufactured at a low cost, and moreover, there is an advantage from the standpoint of a installation space. Further, by providing a distribution in a floodlit pattern of a fill light, a function of projecting a pattern can be provided. Consequently, with respect to a target object having low contrast, it is possible to project required contrast under the condition that the environment is bright, and it is possible to improve a ranging accuracy.

[2] An on-board object recognition apparatus described in the embodiment comprises:
an active range finder 24 having a floodlight unit 30 which floodlights a light onto a target object, and determines a distance up to a target object on the basis of a reflected light therefrom;
a stereo camera 26 to determine a distance up to the target object on the basis of image information from the target object; and
an object recognition unit 110 which recognizes the target object on the basis of an output signal S1 from the active range finder 24 and an output signal S2 from the stereo camera 26, wherein
the active range finder 24 and the stereo camera 26 are provided in a vehicle interior 14.

In the object recognition apparatus, it is possible to provide at least the stereo camera 26 at an upper position in the vehicle interior 14. Thus, the visual field is made sufficiently broad in a case of carrying out detecting a white line on a road or the like. Further, the active range finder 24 and the stereo camera 26 are provided in the vehicle interior 14, so that the object recognition apparatus can be protected from rain, wind, and dust. Moreover, when a position to which the object recognition apparatus is attached is provided at the inner side of the windshield 16 in the vehicle interior 14, the windshield 16 is made to be in a state in which rain drops are removed by a windshield wiper function even if it rains, and therefore, image data without adverse effect due to rain drops can be obtained.

[3] An object recognition apparatus described in the embodiment comprises:
an active range finder 24 having a floodlight unit 30 which floodlights a light onto a target object, and determines a distance up to a target object on the basis of a reflected light therefrom;
a stereo camera 26 to determine a distance up to the target object on the basis of image information from the target object;

an object recognition unit 110 which recognizes the target object on the basis of an output signal S1 from the active range finder 24 and an output signal S2 from the stereo camera 26;

a fill light control unit 116 which controls the floodlight unit 30 to operate so as to irradiate a light floodlit by the floodlight unit 30 of the active range finder 24 as a fill light of the stereo camera 26; and a cover glass 16 disposed in front of the stereo camera 26, wherein, with respect to the cover glass 16, a predetermined region E including a region into which a light that is floodlit from the floodlight unit 30 of the active range finder 24, and is reflected from the target object, is incident serves as an infrared radiation permeable region, and a region other than the predetermined region serves as an infrared radiation permeability-limited region.

In the object recognition apparatus, a necessary infrared radiation reflected from the target object is incident after permeating through the predetermined region E. Therefore, a harmful effect due to an unnecessary infrared radiation making an invasion into the vehicle interior 14 can be avoided.

[4] An object recognition apparatus described in the embodiment comprises:

an active range finder 24 having a floodlight unit 30 which floodlights a light onto a target object, and determines a distance up to a target object on the basis of a reflected light therefrom;

a stereo camera 26 to determine a distance up to the target object on the basis of image information from the target object;

an object recognition unit 110 which recognizes the target object on the basis of an output signal from the active range finder 24 and an output signal from the stereo camera 26;

a fill light control unit 116 which controls the floodlight unit 30 to operate so as to irradiate a light floodlit by the floodlight unit 30 of the active range finder 24 as a fill light of the stereo camera 26; and a cover glass 16 disposed in front of the stereo camera, wherein the cover glass 16 has an available sensitivity region through which a part or all of a frequency domain of an infrared radiation floodlit from the floodlight unit 30 is permeable.

In the object recognition apparatus, a fill light can be effectively applied to the stereo camera 26 provided in the vehicle interior 14.

[5] An object recognition apparatus described in the embodiment comprises:

an active range finder 24 having a floodlight unit 30 which floodlights a light onto a target object, and determines a distance up to a target object on the basis of a reflected light therefrom;

a stereo camera 26 to determine a distance up to the target object on the basis of image information from the target object;

an object recognition unit 110 which recognizes the target object on the basis of an output signal S1 from the active range finder 24 and an output signal S2 from the stereo camera 26; and a fill light control unit 116 which controls the floodlight unit 30 to operate so as to irradiate a light floodlit by the floodlight unit 30 of the active range finder 24 as a fill light of the stereo camera 26, wherein the floodlight unit 30 of the active range finder 24 and the stereo camera 26 are housed in a same housing 22 so as to be unitized.

In the object recognition apparatus, calibration such as position adjustment between the detected visual field of the stereo camera 26 (overlapped region of the visual fields of the left and right cameras) V and the fill light irradiating range (radar scanning region) W, and the like can be executed as a single unit at a stage before attaching it to a movable body such as the vehicle 12.

[6] An object recognition apparatus described in the embodiment is the object recognition apparatus according to the item [5], wherein the stereo camera 26 has two optical input units 46, 66 in order to acquire image information on the target object from different visual directions, and the floodlight unit 30 is mounted at a substantially central position between the two optical input units 46, 66 of the stereo camera 26.

In the object recognition apparatus, it is possible to efficiently irradiate a fill light P onto the detected visual field of the stereo camera 26 (overlapped region of the visual fields of the left and right cameras) V. Further, the integrated unit 20 of the object recognition apparatus can be formed so as to be compact, so that an installation space for the unit 20 can be suppressed to the minimum necessary. Note that, when the target object is a three-dimensional object, a part onto which a fill light is not irradiated is brought about in a shadow part of the target object. However, as described above, the floodlight unit 30 is disposed at substantially the central position between the two optical input units 46 and 66, and consequently, the region onto which a fill light is not irradiated can be made as small as possible.

[7] An object recognition apparatus described in the embodiment comprises:

an active range finder 24 having a floodlight unit 30 which floodlights a light onto a target object, and determines a distance up to a target object on the basis of a reflected light therefrom;

a stereo camera 26 to determine a distance up to the target object on the basis of image information from the target object;

a fill light control unit 116 which irradiates a light floodlit by the floodlight unit 30 of the active range finder 24 as a fill light of the stereo camera 26 onto an irradiating range in a predetermined relationship with a visual field range V of the stereo camera 26; and an object recognition unit 110 which recognizes the target object on the basis of an output signal from the active range finder 24 and an output signal from the stereo camera 26.

In the object recognition apparatus, because the detected visual field range V of the stereo camera 26 and the fill light irradiating range W are adjusted in a predetermined relationship, it is possible to efficiently irradiate a fill light onto the target object of the stereo camera 26.

[8] An object recognition apparatus described in the embodiment comprises:

an active range finder 24 having a floodlight unit 30 which floodlights a light onto a target object, and determines a distance up to a target object on the basis of a reflected light therefrom;

a stereo camera 26 to determine a distance up to the target object on the basis of image information from the target object;

an object recognition unit 110 which recognizes the target object on the basis of an output signal from the active range finder 24 and an output signal from the stereo camera 26;

a fill light control unit 116 which controls the floodlight unit 30 to operate so as to irradiate a light floodlit by the floodlight unit 30 of the active range finder 24 as a fill light of the stereo camera 26; and an adjustment unit which adjusts a range W onto which a light floodlit by the floodlight unit 30 of the active range finder 24 is irradiated as a fill light of the stereo camera 26, with respect to a visual field range V or a reference position of the visual field range V of the stereo camera 26.

[9] An object recognition apparatus described in the embodiment is the object recognition apparatus according to the item [8], wherein the floodlight unit 30 has a light source 50 and a scanning unit 52 which mechanically scans a light flux from the light source 50, and adjusts the range W to be illuminated as a fill light by adjusting a relationship between a light emission timing of the light source 50 and an operation timing of the scanning unit 52.

[10] An object recognition apparatus described in the embodiment is the object recognition apparatus according to the item [8], wherein the floodlight unit 30 has an adjustment unit which adjusts an irradiation angle of a light flux floodlit from the floodlight unit 30.

[11] An object recognition apparatus described in the embodiment comprises:

an active range finder 24 having a floodlight unit 30 which floodlights a light onto a target object, and determines a distance up to a target object on the basis of a reflected light therefrom;

a stereo camera 26 to determine a distance up to the target object on the basis of image information from the target object;

a fill light control unit 116 which causes the floodlight unit 30 of the active range finder 24 to operate as a fill light irradiation unit of the stereo camera 26 at predetermined timings, with respect to imaging operations of the stereo camera 26; and an object recognition unit 110 which recognizes the target object on the basis of an output signal from the active range finder 24 and an output signal from the stereo camera 26.

In the object recognition apparatus, the floodlight unit 30 operates as a fill light irradiation unit at predetermined timings with respect to photographing operations of the stereo camera 26. Therefore, a fill light is effectively irradiated during only a necessary period within the period of the imaging operations.

[12] An object recognition apparatus described in the embodiment is the object recognition apparatus according to the item [11], wherein the fill light control unit 116 irradiates a predetermined irradiating range in one imaging operation.

[13] An object recognition apparatus described in the embodiment is the object recognition apparatus according to the item [11], wherein the fill light control unit 116 irradiates predetermined different irradiating ranges in a plurality of imaging operations.

In the object recognition apparatus, in a case where an object luminance is comparatively bright, and when an exposure period of the image pickup unit (charge storage period) is extremely short (in such a case, it is impossible to irradiate a fill light onto the entire necessary irradiating range during one imaging operation [during an exposure period]), a fill light is irradiated onto the necessary irradiating range separately in a plurality of times of imaging operations.

[14] An object recognition apparatus described in embodiment is the object recognition apparatus according to the item [11], wherein the fill light control unit 116 causes the floodlight unit 30 of the active range finder 24 to selectively operate in only specific imaging operations among a plurality of imaging operations.

In the object recognition apparatus, irradiations of a fill light are prevented from being carried out unnecessarily many times. Therefore, it is possible to prolong the lifetime of the floodlight unit 30.

[15] An object recognition apparatus described in the embodiment comprises:

an active range finder 24 having a floodlight unit 30 which floodlights a light onto a target object, and determines a distance up to a target object on the basis of a reflected light therefrom;

a stereo camera 26 to determine a distance up to the target object on the basis of image information from the target object, the stereo camera being provided in a vehicle interior 14;

an object recognition unit 110 to recognize the target object on the basis of an output signal S1 from the active range finder 24 and an output signal S2 from the stereo camera 26; and a fill light control unit 116 which controls the floodlight unit to operate so as to irradiate a light floodlit by the floodlight unit 30 of the active range finder 24 as a fill light of the stereo camera 26, wherein the stereo camera 26 has spectral sensitivity at which a part or all of a frequency domain of an infrared radiation floodlit from the floodlight unit 30 is captured as an available sensitivity region.

In the object recognition apparatus, an overlapped region is generated on a spectral sensitivity of the stereo camera 26 and a spectral sensitivity of the floodlight unit 30. Therefore, the floodlight unit 30 of the active range finder 24 can be effectively utilized as a fill light irradiation unit of the stereo camera 26.

[16] An object recognition apparatus described in the embodiment comprises:

an active range finder 24 having a floodlight unit 30 which floodlights a light onto a target object, and determines a distance up to a target object on the basis of a reflected light therefrom;

a stereo camera 26 to determine a distance up to the target object on the basis of image information from the target object;

an object recognition unit 110 which recognizes the target object on the basis of an output signal S1 from the active range finder 24 and an output signal S2 from the stereo camera 26; and a fill light control unit 116 which controls the floodlight unit 30 to operate so as to irradiate a light floodlit by the floodlight unit 30 of the active range finder 24 as a fill light of the stereo camera 26, wherein the stereo camera 26 further has an image signal amplifier, and a gain of the image signal amplifier is controlled so as to be variable in accordance with image luminance information accompanying the fill light obtained from the stereo camera 26.

In the object recognition apparatus, when stereo image photographing using a fill light cannot be sufficiently carried out due to a situation of outside light (a situation of infrared disturbance light is made different in accordance with fine weather, night, or the like), and a relationship of a distance up to the target object, gain-up is automatically carried out. As a result, sufficient fill light photographing is always possible.

[17] An object recognition apparatus described in the embodiment comprises:

an active range finder 24 having a floodlight unit 30 which floodlights a light onto a target object, and determines a distance up to a target object on the basis of a reflected light therefrom;

a stereo camera 26 to determine a distance up to the target object on the basis of image information from the target object;

an object recognition unit 110 which recognizes the target object on the basis of an output signal S1 from the active range finder 24 and an output signal S2 from the stereo camera 26; and a fill light control unit 116 which controls the floodlight unit 30 to operate so as to irradiate a light floodlit by the floodlight unit 30 of the active range finder 24 as a fill light of the stereo camera 26, wherein the fill light control unit 116 carries out control of the floodlight unit 30 as a fill light irradiation unit on the basis of image information obtained from the stereo camera 26.

In the object recognition apparatus, fill light irradiations necessary for the stereo camera 26 are carried out in an appropriate manner. Therefore, there is an advantage that an attempt can be made to effectively utilize energy.

[18] An object recognition apparatus described in the embodiment is the object recognition apparatus according to the item [17], wherein the fill light control unit 116 carries out ON/OFF control of the floodlight unit 30 as a fill light irradiation unit in accordance with image information obtained from the stereo camera 26.

In the object recognition apparatus, a fill light is controlled to be turned off when it is determined that a fill light is unnecessary on the basis of stereo image information. Therefore, an attempt at efficient use of energy or the like can be made.

[19] An object recognition apparatus described in the embodiment is the object recognition apparatus according to the item [17], wherein the fill light control unit 116 carries out light intensity control of the floodlight unit 30 as a fill light irradiation unit in accordance with image information obtained from the stereo camera 26.

In the object recognition apparatus, when it is determined that an intensity of a fill light is not required to be so strong, or when it is determined that there is some sort of negative effect because the intensity of the fill light is strong on the basis of stereo image information, the intensity of the fill light is automatically made weaker. On the other hand, when it is determined that a strong fill light is required on the basis of stereo image information, the intensity of the fill light is automatically made stronger. Accordingly, an appropriate intensity of the fill light according to a situation can be set.

[20] An object recognition apparatus described in the embodiment is the object recognition apparatus according to the item [19], wherein the fill light control unit 116 carries out conditioned control of a light intensity of the floodlight unit 30 such that a luminance of the target object falls into a predetermined luminance range, in accordance with image information obtained from the stereo camera 26.

[21] An object recognition apparatus described in the embodiment is the object recognition apparatus according to the item [17], wherein the fill light control unit 116 turns the floodlight unit 30 off, or makes a light intensity weak when it is determined that there is a possibility that a person exists in a region to be an object, in accordance with image information obtained from the stereo camera 26.

In the object recognition apparatus, the human body can be prevented from being damaged by being irradiated with a fill light.

[22] An object recognition apparatus described in the embodiment is the object recognition apparatus according to the item [17], wherein the fill light control unit 116 controls a size of a floodlight spot from the floodlight unit 30 as a fill light irradiation unit, in accordance with image information obtained from the stereo camera 26.

Usually, when an attempt is made to detect a target object which may be at a long distance by a laser radar, a ranging region which can be covered is made greater as a result of making a diameter of a floodlight spot large, and a reflector of a vehicle is detected by the laser radar. In the object recognition apparatus, the information on the stereo image can be used simultaneously, and thus, when a position of the reflector of the vehicle can be detected, it is possible to irradiate a laser with a small diameter whose beam intensity is strong onto the position. As a result, ranging performance by the laser radar is improved.

[23] An object recognition apparatus described in the embodiment is the object recognition apparatus according to the item [17], wherein the fill light control unit 116 controls an irradiating range W by the floodlight unit 30 as a fill light irradiation unit, in accordance with image information obtained from the stereo camera 26.

In the object recognition apparatus, a fill light can be irradiated onto only a necessary irradiating range. Therefore, an attempt at efficient use of energy can be made.

[24] An object recognition apparatus described in the embodiment is the object recognition apparatus according to the item [17], wherein the fill light control unit 116 gradually enhances the floodlight unit 30 as a fill light irradiation unit from being in an off-state or in a state in which a light intensity is comparatively weak to being in a state in which the light intensity is comparatively stronger, at the time of starting operation.

In the object recognition apparatus, it is possible to reduce a loss in energy which is brought about at the time of operating of a sudden with a strong light intensity.

[25] An object recognition apparatus described in the embodiment is the object recognition apparatus according to the item [22], wherein the fill light control unit 116 gradually enhances the floodlight unit 30 as a fill light irradiation unit from being in an off-state or in a state in which a light intensity is comparatively weak to being in a state in which the light intensity is comparatively stronger, at the time of starting operation.

In the object recognition apparatus, it is possible to reduce a loss in energy which is brought about at the time of operating of a sudden with a strong light intensity.

[26] An object recognition apparatus described in the embodiment is the object recognition apparatus according to the item [17], wherein the fill light control unit 116 controls the floodlight unit 30 as a fill light irradiation unit in accordance with luminance information obtained from the stereo camera 26.

In the object recognition apparatus, it is possible to irradiate a fill light such that the intensity thereof is made weak when the luminance is high, and that the intensity thereof is made strong when the luminance is low, in accordance with luminance information. Therefore, a necessary intensity of a fill light can be set in accordance with a luminance, and an attempt at efficient use of energy can be made.

[27] An object recognition apparatus described in the embodiment comprises:

an active range finder 24 having a floodlight unit 30 which floodlights a light onto a target object, and determines a distance up to a target object on the basis of a reflected light therefrom;

a stereo camera 26 to determine a distance up to the target object on the basis of image information from the target object;

an object recognition unit 110 which recognizes the target object on the basis of an output signal S1 from the active range finder 24 and an output signal S2 from the stereo camera 26; and a fill light control unit 116 which controls the floodlight unit 30 to operate so as to irradiate a light floodlit by the floodlight unit 30 of the active range finder 24 as a fill light of the stereo camera 26, wherein the fill light control unit 116 carries out control of the floodlight unit 30 as a fill light irradiation unit in accordance with image information obtained from the stereo camera, and carries out an adjustment of light receiving sensitivity of the stereo camera 26.

In the object recognition apparatus, it is possible to accurately irradiate a fill light necessary for the stereo camera 26. Additionally, it is possible to process a signal in accordance with a size of the output signal S2 from the stereo camera 26. Accordingly, an attempt at efficient use of energy can be made, and moreover, it is possible to ensure a necessary dynamic range for the output signal S2 from the stereo camera 26.

[28] An object recognition apparatus described in the embodiment comprises:

an active range finder 24 having a floodlight unit 30 which floodlights a light onto a target object, and determines a distance up to a target object on the basis of a reflected light therefrom;

a stereo camera 26 to determine a distance up to the target object on the basis of image information from the target object;

an object recognition unit 110 which recognizes the target object on the basis of an output signal S1 from the active range finder 24 and an output signal S2 from the stereo camera 26;

a fill light control unit 116 which controls the floodlight unit 30 to operate so as to irradiate a light floodlit by the floodlight unit 30 of the active range finder 24 as a fill light of the stereo camera 26; and a calibration executing unit which carries out calibration of a distance output signal of the stereo camera 26 by a distance output signal S1 from the active range finder 24.

Generally, a stereo camera has a complicated and delicate optical mechanism, and there is a possibility that an alignment of an optical system is shifted over time due to factors such as vibration. In contrast thereto, the active range finder 24 is comparatively resistant to a change over time. In the object recognition apparatus, calibration with respect to the distance output signal S2 of the stereo camera 26 is appropriately carried out by the distance output signal S1 of the active range finder 24. Therefore, it is possible to realize the object recognition apparatus with less change over time.

[29] An on-board object recognition apparatus described in the embodiment comprises:

an active range finder 24 having a floodlight unit 30 which floodlights a light onto a target object, and determines a distance up to a target object on the basis of a reflected light therefrom;

a stereo camera 26 to determine a distance up to the target object on the basis of image information from the target object;

an object recognition unit 110 which recognizes the target object on the basis of an output signal S1 from the active range finder 24 and an output signal S2 from the stereo camera 26;

a fill light control unit 116 which controls the floodlight unit 30 to operate so as to irradiate a light floodlit by the floodlight unit 30 of the active range finder 24 as a fill light of the stereo camera 26; and an operation condition input unit to input an operation condition of a vehicle 12, wherein the fill light control unit 116 determines an irradiating range W of the floodlight unit 30 as a fill light irradiation unit on the basis of an operation condition inputted by the operation condition input unit.

In the object recognition apparatus, it is possible to irradiate a fill light intensively onto a necessary region or an important region in the detected visual field range V of the stereo camera 26 on the basis of an operation condition input by the operation condition input means. Therefore, an attempt at efficient use of energy or the like can be made.

[30] An object recognition apparatus described in the embodiment is the object recognition apparatus according to the item [29], wherein the operation condition input unit is an input unit which inputs a steering angle of a steering wheel of a vehicle, and the fill light control unit 116 determines an irradiating range of the floodlight unit 30 as a fill light irradiation unit on the basis of a steering angle of a steering wheel inputted from the operation condition input unit.

In the object recognition apparatus, it is possible to irradiate a fill light onto only a region corresponding to a direction in which a steering wheel has been turned in the detected visual field V of the stereo camera 26. Therefore, efficient use of energy or the like is possible.

[31] An object recognition apparatus described in the embodiment comprises:

an active range finder 24 having a floodlight unit 30 which floodlights a light onto a target object, and determines a distance up to a target object on the basis of a reflected light therefrom;

a stereo camera 26 to determine a distance up to the target object on the basis of image information from the target object;

an abject recognition unit 110 which recognizes the target object on the basis of an output signal S1 from the active range finder 24 and an output signal S2 from the stereo camera 26;

a fill light control unit 116 which controls the floodlight unit 30 to operate so as to irradiate a light floodlit by the floodlight unit 30 of the active range finder 24 as a fill light of the stereo camera 26; and a reliability determining unit 118 to determine reliability in object recognition performance on the basis of the output signal S1 from the active range finder 24 and the output signal S2 from the stereo camera 26.

In the object recognition apparatus, determination on the reliability is carried out by comparing the distance output signal S1 from the active range finder 24 and the distance output signal S2 from the stereo camera 26. Thus, when the reliability is damaged, it is possible to rapidly and accurately handle the problem.

[32] An object recognition apparatus described in the embodiment comprises:

an active range finder 24 having a floodlight unit 30 which floodlights a light onto a target object, and determines a distance up to a target object on the basis of a reflected light therefrom;

a stereo camera 26 including an image pickup unit 46 to acquire image information from the target object, and to periodically determine a distance up to a target object by causing the image pickup unit 46 to periodically operate;

an object recognition unit 110 which recognizes the target object on the basis of an output signal S1 from the active range finder 24 and an output signal S2 from the stereo camera 26;

a fill light control unit 116 which controls the floodlight unit 30 to operate so as to irradiate a light floodlit by the floodlight unit 30 of the active range finder 24 as a fill light of the stereo camera 26; and a floodlight control unit 96, 120 which, during a period of an operation cycle of the image pickup unit 46, causes the floodlight unit 30 to operate as a fill light irradiation unit of the stereo camera 26 within a time frame of carrying out charge storage, and causes the floodlight unit 30 to operate as the active range finder 24 out of a time frame of carrying out charge storage.

In the object recognition apparatus, imaging operations of the stereo camera 26 using a fill light are periodically carried out, and original ranging operations of the active range finder 24 are carried out between intervals thereof. Accordingly, both detection systems of the active range finder 24 and the stereo camera 26 are effectively operated within a limited period.

[33] An object recognition apparatus described in the embodiment is the object recognition apparatus according to one of the items [1] to [8], and [10] to [32], wherein the floodlight unit 30 includes a light source 50 and a scanning unit 52 (54, 56) which mechanically scans a light flux from the light source 50.

[34] An object recognition apparatus described in the embodiment is the object recognition apparatus according to one of the items [1] to [32], wherein the active range finder 24 is a laser radar.

[35] The embodiment describes a calibration method in an object recognition apparatus comprising:

an active range finder 24 having a floodlight unit 30 which floodlights a light onto a target object, and determines a distance up to a target object on the basis of a reflected light therefrom;

a stereo camera 26 to determine a distance up to the target object on the basis of image information from the target object;

an object recognition unit 110 which recognizes the target object on the basis of an output signal from the active range finder 24 and an output signal from the stereo camera 26; and a fill light control unit 116 which controls the floodlight unit 30 to operate so as to irradiate a light floodlit by the floodlight unit 30 of the active range finder 24 as a fill light of the stereo camera 26, wherein calibration of a distance output signal of the stereo camera 26 is carried out by using a distance output signal obtained from the active range finder 24.

MODIFIED EXAMPLE

The object recognition apparatus shown in the embodiments includes the following modified example.

There is provided a structural requirement that a light emission intensity of the laser light source 50 is made to be in a state of being off or comparatively weak immediately after operation, and is made stronger by degrees from the state.

Because a laser beam having a strong intensity can be avoided from being suddenly emitted in a state in which the environment is bright, and when a fill light by the laser light source 50 is not necessarily required, it is possible to prevent energy from being wasted.

Use of the apparatus makes it possible to recognize the surrounding circumstances with great accuracy. Therefore, for example, the apparatus is mounted on a movable body such as a vehicle or the like, so that the apparatus is made extremely useful at the time of making an attempt to safely drive the movable body.

What is claimed is:

1. An object recognition apparatus comprising:
    an active range finder having a floodlight unit which floodlights a light onto a target object, and determines a distance up to a target object on the basis of a reflected light therefrom;
    a stereo camera to determine a distance up to the target object on the basis of image information from the target object;
    an object recognition unit which recognizes the target object on the basis of an output signal from the active range finder and an output signal from the stereo camera; and
    a fill light control unit which controls the floodlight unit to operate so as to irradiate a light floodlit by the floodlight unit of the active range finder as a fill light of the stereo camera.

2. The object recognition apparatus according to claim 1, wherein
    the active range finder and the stereo camera are provided in a vehicle interior.

3. An object recognition apparatus comprising:
    an active range finder having a floodlight unit which floodlights a light onto a target object, and determines a distance up to a target object on the basis of a reflected light therefrom;
    a stereo camera to determine a distance up to the target object on the basis of image information from the target object;
    an object recognition unit which recognizes the target object on the basis of an output signal from the active range finder and an output signal from the stereo camera;
    a fill light control unit which controls the floodlight unit to operate so as to irradiate a light floodlit by the floodlight unit of the active range finder as a fill light of the stereo camera; and
    a cover glass disposed in front of the stereo camera, wherein,
    with respect to the cover glass, a predetermined region including a region into which a light that is floodlit from the floodlight unit of the active range finder, and is reflected from the target object, is incident serves as an infrared radiation permeable region, and a region other than the predetermined region serves as an infrared radiation permeability-limited region.

4. The object recognition apparatus according to claim 1 further comprising:
    a cover glass disposed in front of the stereo camera, wherein
    the cover glass has an available sensitivity region through which a part or all of a frequency domain of an infrared radiation floodlit from the floodlight unit is permeable.

5. The object recognition apparatus according to claim 1, wherein the floodlight unit of the active range finder and the stereo camera are housed in a same housing so as to be unitized.

6. The object recognition apparatus according to claim 5, wherein
the stereo camera has two optical input units in order to acquire image information on the target object from different visual directions, and
the floodlight unit is mounted at a substantially central position between the two optical input units of the stereo camera.

7. The object recognition apparatus according to claim 1 further comprising:
an adjustment unit which adjusts a range onto which a light floodlit by the floodlight unit of the active range finder is irradiated as a fill light of the stereo camera, with respect to a visual field range or a reference position of the visual field range of the stereo camera.

8. The object recognition apparatus according to claim 7, wherein
the floodlight unit has a light source and a scanning unit which mechanically scans a light flux from the light source, and adjusts the range to be illuminated as a fill light by adjusting a relationship between a light emission timing of the light source and an operation timing of the scanning unit.

9. The object recognition apparatus according to claim 7, wherein
the floodlight unit has an adjustment unit which adjusts an irradiation angle of a light flux floodlit from the floodlight unit.

10. The object recognition apparatus according to claim 1 wherein the fill light control unit performs the controls of the floodlight unit at predetermined timings, with respect to imaging operations of the stereo camera.

11. The object recognition apparatus according to claim 10, wherein
the fill light control unit includes an irradiation unit which irradiates a predetermined irradiating range in one imaging operation.

12. The object recognition apparatus according to claim 10, wherein
the fill light control unit includes an irradiation unit which irradiates predetermined different irradiating ranges in a plurality of imaging operations.

13. The object recognition apparatus according to claim 10, wherein
the fill light control unit includes an operation unit which causes the floodlight unit of the active range finder to selectively operate in only specific imaging operations among a plurality of imaging operations.

14. The object recognition apparatus according to claim 1 wherein
the stereo camera has spectral sensitivity at which a part or all of a frequency domain of an infrared radiation floodlit from the floodlight unit is captured as an available sensitivity region.

15. The object recognition apparatus according to claim 1 wherein
the stereo camera further has an image signal amplifier, and a gain of the image signal amplifier is controlled so as to be variable in accordance with image luminance information accompanying the fill light obtained from the stereo camera.

16. The object recognition apparatus according to claim 1 wherein
the fill light control unit carries out control of the floodlight unit as a fill light irradiation unit on the basis of image information obtained from the stereo camera.

17. The object recognition apparatus according to claim 16, wherein
the fill light control unit carries out ON/OFF control of the floodlight unit as a fill light irradiation unit in accordance with image information obtained from the stereo camera.

18. The object recognition apparatus according to claim 16, wherein
the fill light control unit carries out light intensity control of the floodlight unit as a fill light irradiation unit in accordance with image information obtained from the stereo camera.

19. The object recognition apparatus according to claim 18, wherein
the fill light control unit carries out conditioned control of a light intensity of the floodlight unit such that a luminance of the target object falls into a predetermined luminance range, in accordance with image information obtained from the stereo camera.

20. The object recognition apparatus according to claim 16, wherein
the fill light control unit turns the floodlight unit off, or makes a light intensity weak when it is determined that there is a possibility that a person exists in a region to be an object, in accordance with image information obtained from the stereo camera.

21. The object recognition apparatus according to claim 16, wherein
the fill light control unit controls a size of a floodlight spot from the floodlight unit as a fill light irradiation unit, in accordance with image information obtained from the stereo camera.

22. The object recognition apparatus according to claim 16, wherein
the fill light control unit controls an irradiating range by the floodlight unit as a fill light irradiation unit, in accordance with image information obtained from the stereo camera.

23. The object recognition apparatus according to claim 16, wherein
the fill light control unit gradually enhances the floodlight unit as a fill light irradiation unit from being in an off-state or in a state in which a light intensity is comparatively weak to being in a state in which the light intensity is comparatively stronger, at the time of starting operation.

24. The object recognition apparatus according to claim 21, wherein
the fill light control unit gradually enhances the floodlight unit as a fill light irradiation unit from being in an off-state or in a state in which a light intensity is comparatively weak to being in a state in which the light intensity is comparatively stronger, at the time of starting operation.

25. The object recognition apparatus according to claim 16, wherein
the fill light control unit controls the floodlight unit as a fill light irradiation unit in accordance with luminance information obtained from the stereo camera.

26. The object recognition apparatus according to claim 1 wherein
the fill light control unit carries out control of the floodlight unit as a fill light irradiation unit in accordance with image information obtained from the stereo camera, and carries out an adjustment of light receiving sensitivity of the stereo camera.

27. The object recognition apparatus according to claim 1 further comprising:
a calibration executing unit which carries out calibration of a distance output signal of the stereo camera by a distance output signal from the active range finder.

28. An on-board object recognition apparatus comprising:
an active range finder having a floodlight unit which floodlights a light onto a target object, and determines a distance up to a target object on the basis of a reflected light therefrom;
a stereo camera to determine a distance up to the target object on the basis of image information from the target object;
an object recognition unit which recognizes the target object on the basis of an output signal from the active range finder and an output signal from the stereo camera;
a fill light control unit which controls the floodlight unit to operate so as to irradiate a light floodlit by the floodlight unit of the active range finder as a fill light of the stereo camera; and
an operation condition input unit to input an operation condition of a vehicle, wherein
the fill light control unit determines an irradiating range of the floodlight unit as a fill light irradiation unit on the basis of an operation condition inputted by the operation condition input unit.

29. The object recognition apparatus according to claim 28, wherein
the operation condition input unit is an input unit which inputs a steering angle of a steering wheel of a vehicle, and
the fill light control unit determines an irradiating range of the floodlight unit as a fill light irradiation unit on the basis of a steering angle of a steering wheel input from the operation condition input unit.

30. The object recognition apparatus according to claim 1 comprising:
a reliability determining unit to determine reliability in object recognition performance on the basis of the output signal from the active range finder and the output signal from the stereo camera.

31. The object recognition apparatus according to claim 1, the floodlight unit includes a light source and a scanning unit which mechanically scans a light flux from the light source.

32. The object recognition apparatus according to claim 1, wherein the active range finder is a laser radar.

* * * * *